(12) United States Patent
Ono et al.

(10) Patent No.: US 10,175,924 B2
(45) Date of Patent: Jan. 8, 2019

(54) INFORMATION PROCESSING SYSTEM

(71) Applicant: FUJI XEROX CO., LTD., Tokyo (JP)

(72) Inventors: Masafumi Ono, Yokohama (JP); Kunitoshi Yamamoto, Yokohama (JP); Tomotaka Matsuyuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 94 days.

(21) Appl. No.: 15/213,923

(22) Filed: Jul. 19, 2016

(65) Prior Publication Data
US 2017/0277500 A1 Sep. 28, 2017

(30) Foreign Application Priority Data

Mar. 25, 2016 (JP) ................................ 2016-062457

(51) Int. Cl.
| | |
|---|---|
| *G09F 27/00* | (2006.01) |
| *G06F 3/14* | (2006.01) |
| *G06K 9/00* | (2006.01) |
| *G09F 9/33* | (2006.01) |
| *G09F 9/35* | (2006.01) |
| *G06Q 30/02* | (2012.01) |
| *G06Q 50/00* | (2012.01) |
| *G06F 3/01* | (2006.01) |

(52) U.S. Cl.
CPC ....... *G06F 3/1446* (2013.01); *G06K 9/00369* (2013.01); *G06Q 30/02* (2013.01); *G06Q 30/0271* (2013.01); *G06Q 50/01* (2013.01); *G09F 9/33* (2013.01); *G09F 9/35* (2013.01); *G09F 27/005* (2013.01); *G06F 3/013* (2013.01); *G09F 2027/001* (2013.01)

(58) Field of Classification Search
CPC ... G06F 3/1446; G06F 3/013; G06K 9/00369; G09F 9/33; G09F 9/35; G09F 27/005; G09F 2027/001; H04W 4/008
See application file for complete search history.

(56) References Cited

U.S. PATENT DOCUMENTS

| | | | | |
|---|---|---|---|---|
| 2003/0078840 A1* | 4/2003 | Strunk | ............... | G06Q 30/0254 705/14.52 |
| 2003/0105719 A1* | 6/2003 | Berger | ................ | G06F 21/6245 705/51 |
| 2004/0179040 A1* | 9/2004 | Patel | ...................... | G06Q 20/04 715/772 |

(Continued)

FOREIGN PATENT DOCUMENTS

| | | |
|---|---|---|
| JP | 4379374 B2 | 12/2009 |
| JP | 2014-115897 A | 6/2014 |
| WO | 2007/057843 A1 | 5/2007 |

OTHER PUBLICATIONS

Feb. 13, 2017 Extended Search Report issued in European Patent Application No. 16185195.1.

*Primary Examiner* — Michael J Eurice
(74) *Attorney, Agent, or Firm* — Oliff PLC

(57) ABSTRACT

There is provided an information processing system. A recognition unit recognizes a user near a display device that displays information. An acquiring unit acquires information of an interest level with respect to each theme of the user who is recognized by the recognition unit. A display control unit controls the display device to highlight the information on the theme according to the interest level corresponding to the theme.

8 Claims, 23 Drawing Sheets

(56) References Cited

U.S. PATENT DOCUMENTS

| | | | |
|---|---|---|---|
| 2007/0061735 A1* | 3/2007 | Hoffberg | G06F 9/4443 715/744 |
| 2007/0273611 A1* | 11/2007 | Torch | A61B 3/0066 345/8 |
| 2010/0007601 A1* | 1/2010 | Lashina | G06F 3/013 345/156 |
| 2011/0077548 A1* | 3/2011 | Torch | A61B 3/112 600/558 |
| 2012/0075168 A1* | 3/2012 | Osterhout | G02B 27/017 345/8 |
| 2013/0235347 A1* | 9/2013 | Hennessey | G06F 3/013 351/210 |
| 2014/0163329 A1* | 6/2014 | Brown, Jr. | A61B 3/113 600/301 |
| 2014/0184550 A1* | 7/2014 | Hennessey | G06F 3/013 345/173 |
| 2014/0186010 A1* | 7/2014 | Guckenberger | G11B 27/031 386/248 |
| 2014/0237423 A1* | 8/2014 | Hayashi | G06F 3/0481 715/802 |
| 2014/0247146 A1* | 9/2014 | Proud | H02J 50/10 340/870.02 |
| 2014/0347265 A1* | 11/2014 | Aimone | G09G 3/003 345/156 |
| 2014/0379781 A1* | 12/2014 | Kobayashi | H04L 67/10 709/203 |
| 2015/0081210 A1* | 3/2015 | Yeh | A61B 5/7415 701/428 |
| 2015/0286449 A1* | 10/2015 | Masui | G06Q 10/06 358/1.14 |
| 2015/0330805 A1* | 11/2015 | Cho | H04W 4/02 701/428 |
| 2015/0338915 A1* | 11/2015 | Publicover | G06F 21/64 345/633 |
| 2016/0012475 A1* | 1/2016 | Liu | G06F 3/013 705/14.49 |
| 2016/0093081 A1* | 3/2016 | Kim | G06F 3/012 345/156 |
| 2016/0170584 A1* | 6/2016 | Kumar | G06F 3/013 715/811 |
| 2016/0220198 A1* | 8/2016 | Proud | A61B 5/4809 |
| 2017/0003740 A1* | 1/2017 | Verfaillie | G06F 3/013 |

* cited by examiner

FIG. 9

| CONTENT | INTEREST LEVEL (SYMPATHY LEVEL) | KEYWORD | INTEREST LEVEL (SYMPATHY LEVEL) |
|---|---|---|---|
| | 20 | SUNSET | 10 |
| | | SPACE | 5 |
| | | CLOUD | 5 |
| | | PICTURE | 3 |
| | 10 | NINJA | 30 |
| | | BLADE | 5 |
| | | JAPAN | 5 |
| | | PICTURE | 3 |
| ... | ... | ... | ... |

FIG. 22

| USER ID | CONTENT | INTEREST LEVEL (SYMPATHY LEVEL) | KEYWORD | INTEREST LEVEL (SYMPATHY LEVEL) |
|---|---|---|---|---|
| TANAKA | | 20 | SUNSET | 10 |
| | | | SPACE | 5 |
| | | | CLOUD | 5 |
| | | | PICTURE | 3 |
| | | 10 | NINJA | 30 |
| | | | BLADE | 5 |
| | | | JAPAN | 5 |
| | | | PICTURE | 3 |
| INOUE | | 40 | SUNSET | 20 |
| | | | SPACE | 20 |
| | | | CLOUD | 5 |
| | | | PICTURE | 10 |

INFORMATION PROCESSING SYSTEM

CROSS-REFERENCE TO RELATED APPLICATIONS

This application is based on and claims priority under 35 U.S.C. § 119 from Japanese Patent Application No. 2016-062457 filed on Mar. 25, 2016.

TECHNICAL FIELD

The present invention relates to an information processing system.

SUMMARY

There is provided an information processing system including: a recognition unit that recognizes a user near a display device that displays information; an acquiring unit that acquires information of an interest level with respect to each theme of the user who is recognized by the recognition unit; and a display control unit that controls the display device to highlight the information on the theme according to the interest level corresponding to the theme.

BRIEF DESCRIPTION OF THE DRAWINGS

Exemplary embodiments of the present invention will be described in detailed based on the following figures, wherein:

FIG. 9 is a diagram schematically illustrating an instance of data stored in an interest level storage unit;

FIG. 22 is a diagram schematically illustrating an instance of a data content stored in an interest level DB of the server;

DETAILED DESCRIPTION

First Example of Entire Configuration of System

Figure 1:
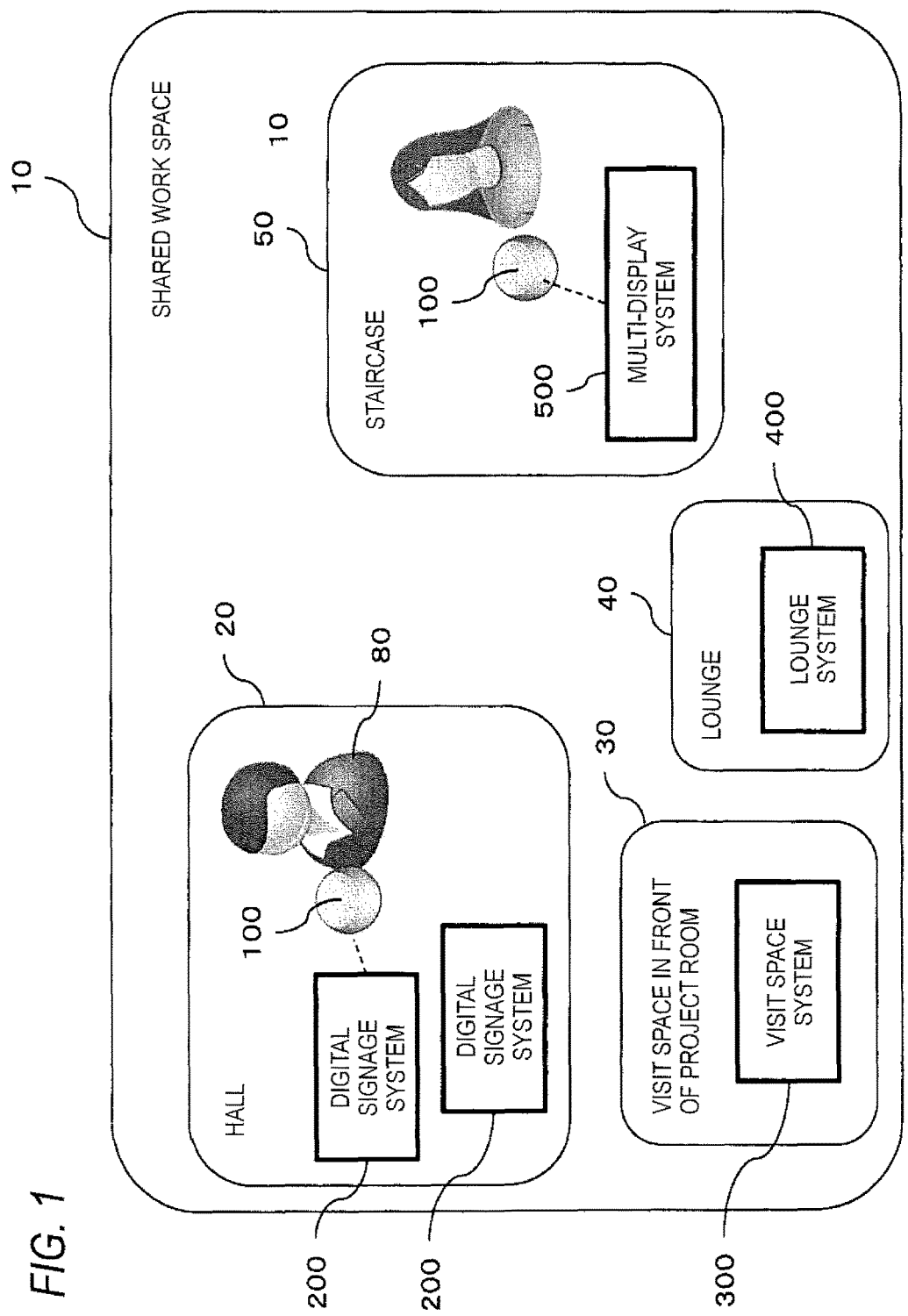
FIG. 1 is a diagram illustrating an instance of the entire system configuration of a first example.
Figure 2:
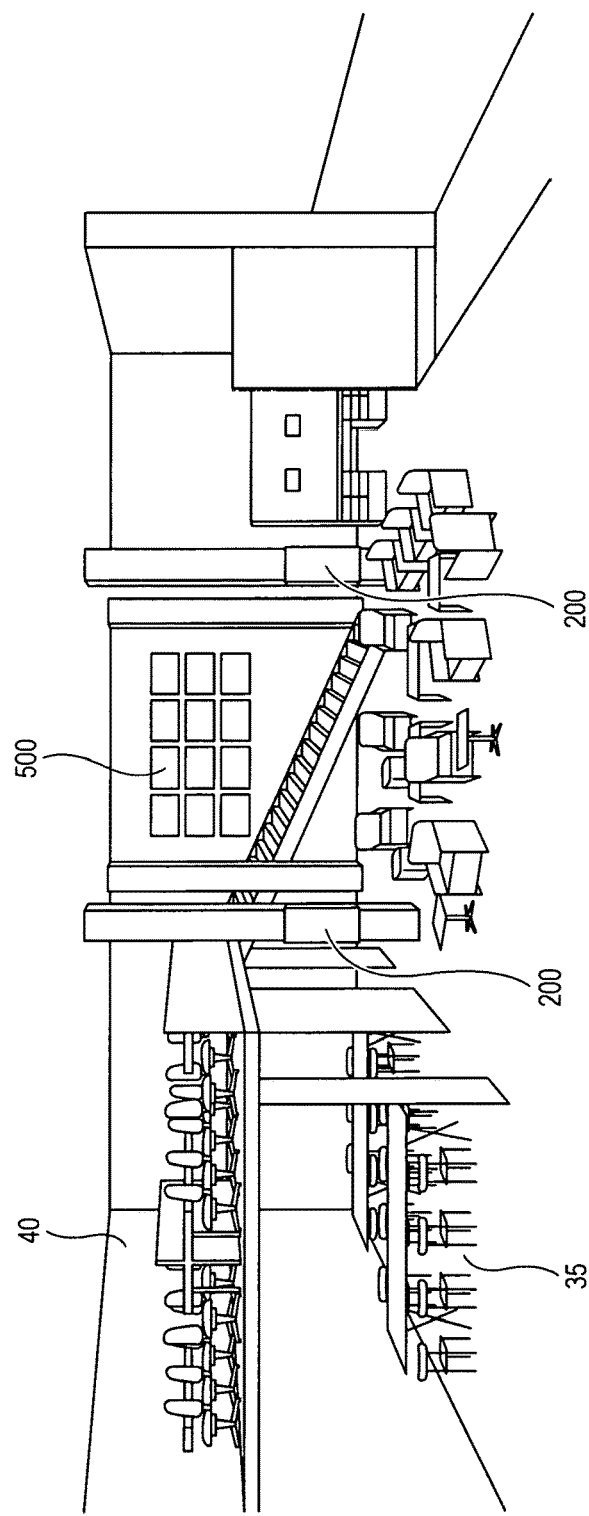
FIG. 2 is a diagram illustrating an instance of a shared work space provided in a system of the first example.

First, the entire system to which a multi-display system 500 of this exemplary embodiment can be applied will be described. As an instance, the system is installed in a shared work space 10 as illustrated in FIGS. 1 and 2. The shared work space 10 is, for instance, a facility to provide a place where an organization such as NPO (Non Profit Organization), a small company, and local residents are gathered together to carry out various types of businesses such as volunteer work. The exemplary shared work space 10 is provided with various project rooms 35, halls 20, and lounges 40 where people use that space as work places/meeting places.

Each user 80 entering the shared work space 10 carries with a self ball 100, and circulates in that facility. The self ball 100 is an information presentation apparatus which serves as an avatar of the user 80. The self ball 100 has identification information (user ID) of the user 80 who carries therewith. Each system described below identifies the user by acquiring the user ID from the self ball 100.

Figure 3:
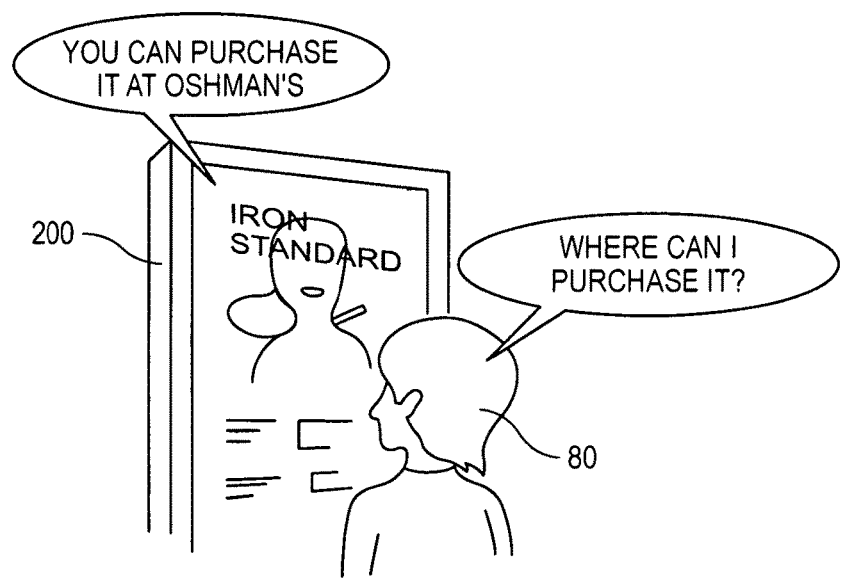
FIG. 3 is a diagram illustrating an exemplary usage of a digital signage system.

A digital signage (electronic signboard) system 200 is installed in each place in the hall 20. As illustrated in FIG. 3, the digital signage system 200 displays an image content such as a predetermined still image or a predetermined moving image in a screen of the display device such as a liquid crystal display. There may have a function of outputting an auxiliary voice through a speaker with the display of the image content. For instance, the displayed content may be interactively displayed such that a content associated to a touched place is displayed when the user 80 touches the screen. In addition, the digital signage system 200 detects a voice reaction (for instance, a question) from the user 80 using a microphone. The content of the reaction is recognized by a recognition system of a voice and a natural language. The process may be performed according to the recognized result. In the scene illustrated in FIG. 3, the user 80 orally asks a question about a place where a product denoted with the displayed content is available. With this regard, the digital signage system 200 orally replies to the place where the product is available. In addition, the digital signage system 200 has a function of obtaining an interest level of the user with respect to the content being presented other than such a signage function. The "interest level" of the user with respect to the content is a numerical value indicating a degree of user's interest in the content. While the details are described below, the interest level is calculated from, for instance, a time length that the user pays attention to the content, presence/absence of a user's reaction to the content, and a frequency of the reaction. It can be said that the interest is high as the attention time is long, or the interest is high when the user reacts to the question with respect to the content.

A visit space 30 is provided in front of the project room 35 for visiting a work taken place therein. A visit space system 300 is provided in the visit space 30 to obtain the interest level of the user 80 with respect to the work taken place in the project room 35. In addition, while not illustrated in the drawing, the same system as the visit space system 300 may be provided for a fixed article (for instance, a printed poster, a model of a device, or a real device) exhibited in the shared work space 10 in order to obtain the interest level of the user 80 with respect to the article.

Figure 4:
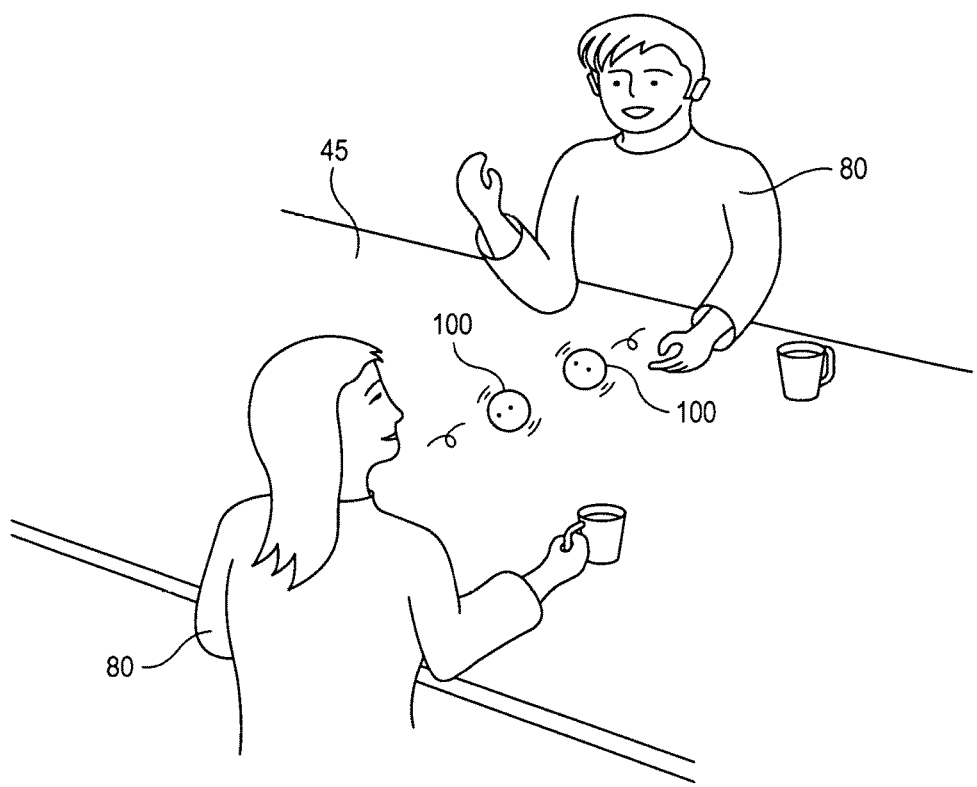
FIG. 4 is a diagram illustrating an instance of a communication promoting operation of a self ball.

A lounge system 400 is provided in the lounge 40 which is a place for notification, The lounge system 400 is configured to promote the communication among the users 80 who happen to be in the lounge 40 (more specifically, the users are notified about that they gathered there are interested in a common theme). For instance, as illustrated in the instance of FIG. 4, in a case where two users 80 meeting by chance at a table 45 in the lounge 40 while holding a drink are interested in the same content or theme (that is, the users sympathize with a common theme), the self balls 100 placed on the table 45 are rolled and mutually approached and thus it motivates the conversation of two persons. Such a communication promoting operation is realized in cooperation of the self ball 100 with the lounge system 400. As an interest target of the user 80, information of interest and concern of the user 80 obtained by the digital signage system 200 and the visit space system 300 is used. In addition, information posted by the user in SNS (Social Networking Service) may used.

Figure 5:
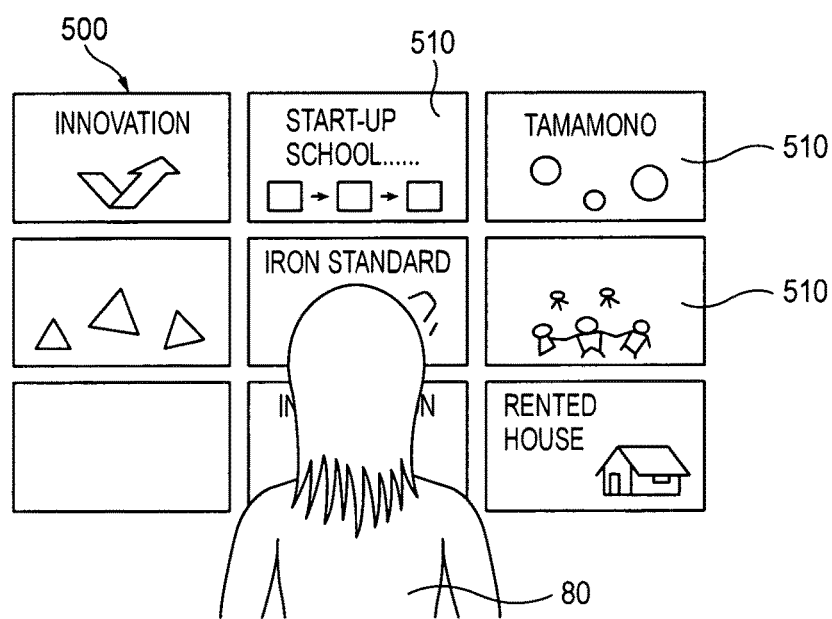
FIG. 5 is a diagram illustrating an exemplary usage of a multi-display system.

The multi-display system 500 is provided in a staircase 50. The multi-display system 500 is provided with plural display devices 510 (for instance, the liquid crystal displays) disposed in a grid pattern in FIG. 5. Some contents having a high interest of the user 80 are displayed in the plural display devices 510.

The installation places of the respective systems 200, 300, 400, and 500 illustrated in FIGS. 1 and 2 are given as merely instance.

Figure 6:
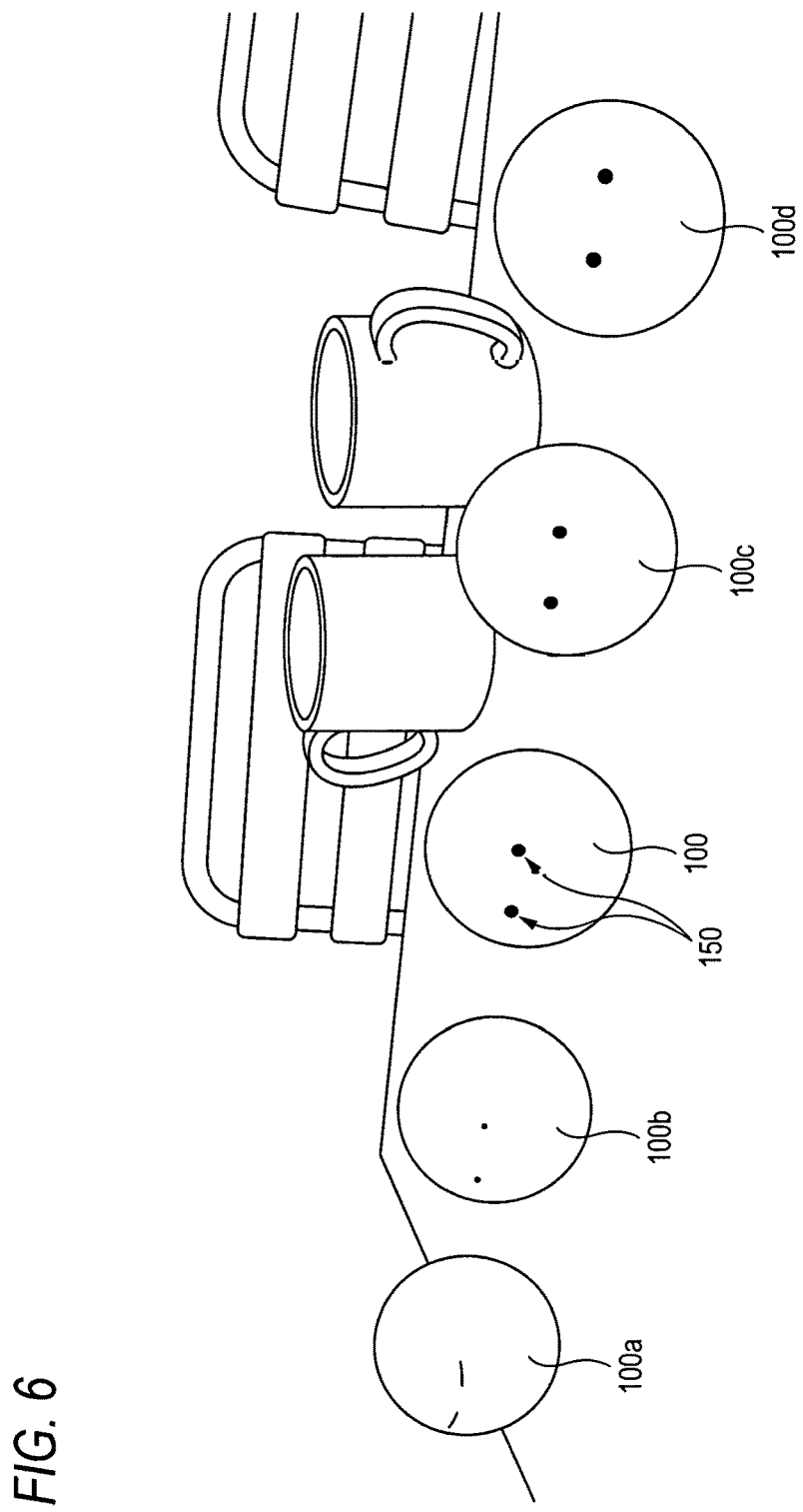
FIG. 6 is a diagram illustrating a change in appearance of the self ball.

The self ball 100 carried by the user 80 has "eyes" 150 as illustrated in FIG. 6. The eyes 150 show the state of the self ball 100. For instance, the eyes 150 of a self ball 100a at the left end in the drawing show a state "sleep" (that is, asleep). For instance, the eyes 150 becomes the sleep state when the self ball 100a is set to a charger. The eyes 150 of a second self ball 100b from the left side in the drawing are in a state where the self ball is brought back from the charger (that is, a so-called "awaken"). The eyes 150 are circular but small. Thereafter, when the user carried with the self ball 100 looks at the digital signage and the project room 35 while going around the shared work space 10 and the interest rises, the eyes 150 becomes large. In this way, the size of the eyes 150 expresses a degree of user's current interest in an object in the shared work space 10. A change in the shape of the eyes 150 may be expressed by a liquid crystal display, for instance.

In addition, the self ball 100 includes a light-emitting function, and a brightness of the emitting light is changed according to a degree of the user's interest. For instance, in a case where the interest in the content that the user 80 currently views is high to some degree, the light emission is weak as a self ball 100c illustrated in the drawing. In a case where the interest is very high, the light emission is strong as a self ball 100d illustrated in the drawing. The light emission of the self ball 100 may be controlled according to a psychological state of the user 80. For instance, the brightness is controlled according to the psychological state. The psychological state of the user 80 is estimated from a pulse rate and a body temperature detected by a wearable device (for instance, a wrist watch equipped with an information processing function) which the user 80 puts on, and an expression of the user's face captured by the lounge system 400. In addition, the light emission of the self ball 100 may be controlled according to emitting color as well as the brightness.

Figure 7:
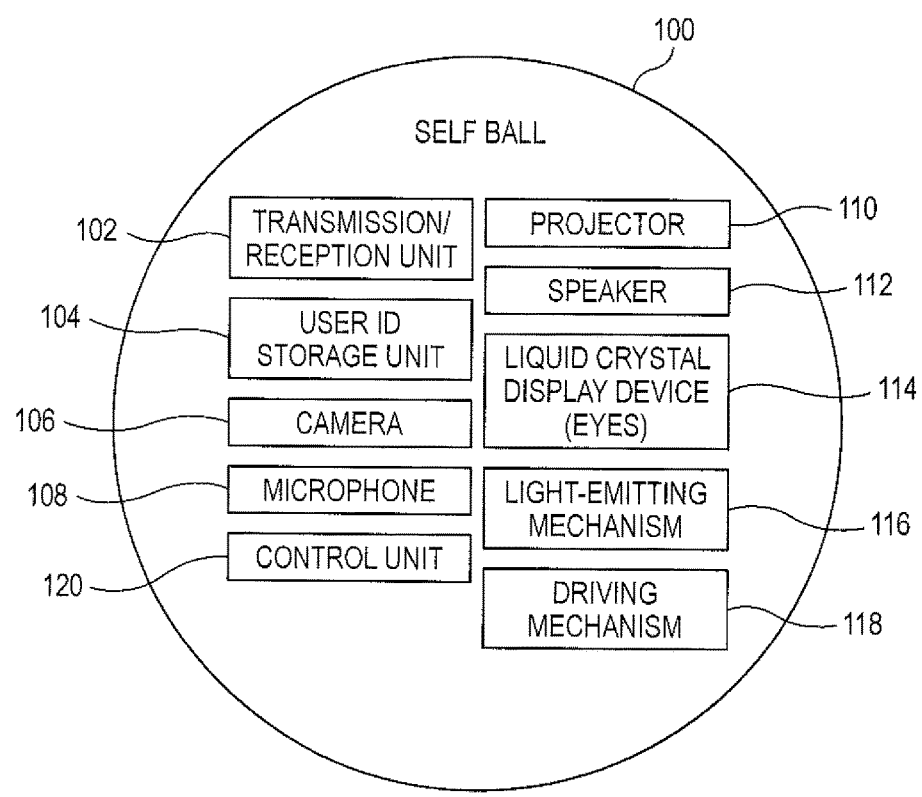
FIG. 7 is a diagram illustrating an exemplary functional configuration of the self ball.

FIG. 7 illustrates mechanical components of the self ball 100. As illustrated in the drawing, the self ball 100 has a transmission/reception unit 102, a user ID storage unit 104, a camera 106, a microphone 108, a projector 110, a speaker 112, a liquid crystal display device 114, a light-emitting mechanism 116, a driving mechanism 118, and a control unit 120 built therein.

The transmission/reception unit 102 is a device for the communication with other devices (for instance, the digital signage system 200 and the lounge system 400) in the shared work space 10. The transmission/reception unit 102 performs wireless communication in conformity to a wireless communication standard such as a wireless LAN (Local Area Network) or Bluetooth (registered trademark). The transmission/reception unit 102 may include plural wireless communication devices for the communication in conformity to different wireless communication standards, and differently use the respective communication devices according to its purpose.

The user ID storage unit 104 stores the identification information of the user 80 carrying with the self ball 100. In other words, the user 80 is identified at least in the shared work space 10 by the user ID stored in the user ID storage unit 104 of the self ball 100 of the user.

The camera 106 captures an image such as a still image and a moving image of the surroundings of the self ball 100. The microphone 108 detects a voice (for instance, a voice of the user 80) from the surroundings of the self ball 100. The captured image and the detected voice are sent to the control unit 120.

The projector 110 projects the image such as the still image or the moving image to the outside (for instance, the upper surface of the top of the table 45). The projecting image is supplied from the control unit 120. The speaker 112 outputs a voice supplied from the control unit 120. In an instance, the voice is synchronized with the image displayed by the projector 110 (for instance, a voice of multimedia content). In another instance, the voice is an independent voice accompanied with no image display.

The liquid crystal display device 114 is a device which expresses a far 111 of the eyes 150 of the self ball 100. The liquid crystal display device 114 may be a monochrome liquid crystal display of a dot matrix manner, for instance.

The light-emitting mechanism 116 is a device which causes the self ball 100 to emit light. The light-emitting mechanism 116 is provided with, for instance, an LED (Light Emitting Diode) which can dim the light (adjustment of emission intensity) as a light-emitting device. In addition, in an instance where the emission color is changed, the light-emitting mechanism 116 is provided with dimmable LEDs of three primary colors. The control unit 120 adjusts a ratio of the emission intensities of these three-color LEDs to control the emission color and the emission intensity. In an instance, the inner surface of a spherical shell of the self ball 100 is frosted like a frosted glass. When the light emitted from the light-emitting mechanism 116 provided inside the spherical shell is scattered in the frosted surface, the entire self ball 100 is looked like a light emitting body. In this instance, the liquid crystal display expressing the eyes 150 of the self ball 100 is provided in, for instance, the surface of the spherical shell. The external surface of the spherical shell containing the liquid crystal display is covered with a transparent protection layer.

The driving mechanism 118 is a mechanism for moving the self ball 100 on the surface of the table 45. The driving mechanism 118 spins the spherical shell of the self ball 100 to roll the self ball 100 on the surface, or controls a posture of the self ball 100 such that the eyes 150 and the projector 110 head for an appropriate direction. As the driving mechanism 118, for instance, a driving mechanism of a ball as disclosed in U.S. Pat. No. 9,193,404 may be used. In addition, U.S. Pat. No. 9,090,214 discloses a self-propelled device which includes a spinning ball and an external accessory magnetically coupled with the ball. The self-propelled device may be used in place of the spherical self ball 100. In this case, when the eyes 150, the camera 106, and the projector 110 are built in the external accessory portion, there is no need of a posture control on the spherical portion. The driving mechanism 118 may include a vibration mechanism which vibrates the self ball 100.

Figure 8:
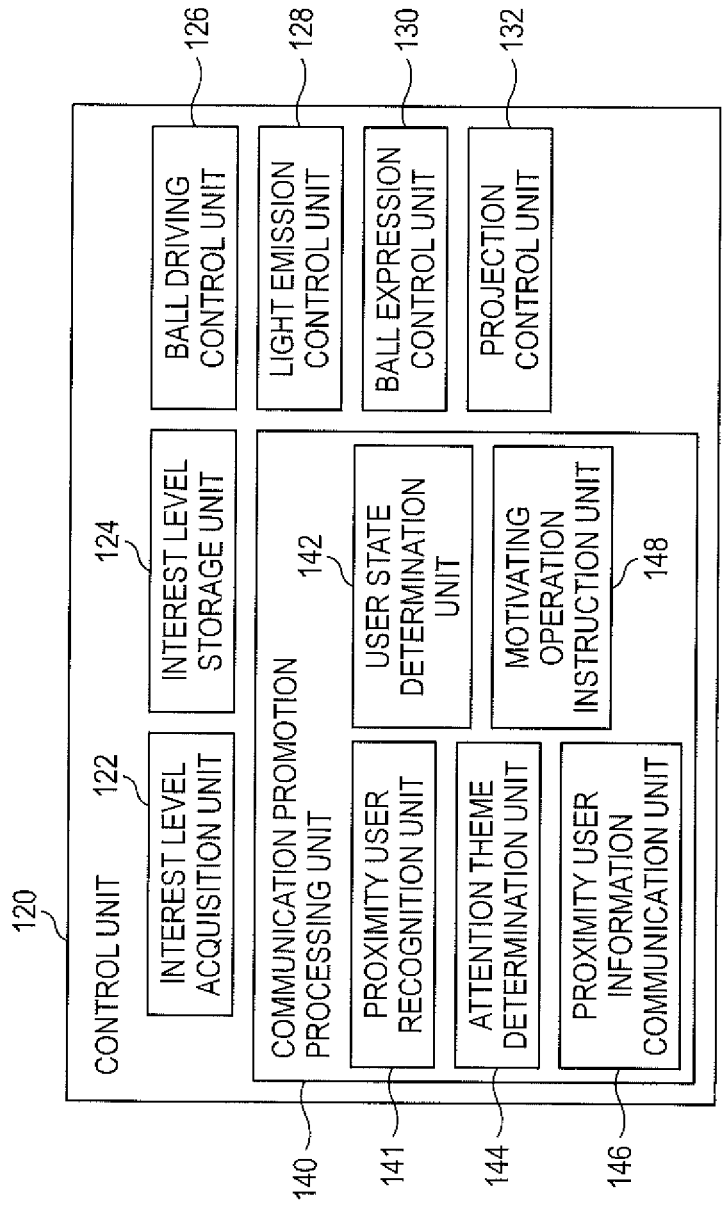
FIG. 8 is a diagram illustrating an exemplary functional configuration of a control unit of the self ball.

The control unit 120 controls the respective units of the self ball 100. FIG. 8 illustrates an exemplary functional configuration of the control unit 120. The control unit 120 in the instance includes an interest level acquisition unit 122, an interest level storage unit 124, a ball driving control unit 126, a light emission control unit 128, a ball expression control unit 130, a projection control unit 132, and a communication promotion processing unit 140. The control unit 120 is provided with for controlling a functional module the camera 106, the microphone 108, and the speaker 112 besides these functional modules in the drawing. However, these components may be employed with typical components, and thus the descriptions thereof will be omitted.

The interest level acquisition unit 122 acquires interest level information of the user 80 with respect to the content and the theme. For instance, the digital signage system 200, the visit space system 300, and the lounge system 400 obtain the interest level of the user 80 with respect to the content and the theme. The interest level acquisition unit 122 acquires the obtained interest level information from the digital signage system 200.

The interest level storage unit 124 is a database in which the interest level information acquired by the interest level acquisition unit 122 is stored. FIG. 9 illustrates an instance of information stored in the interest level storage unit 124.

In this instance, a value of the interest level in the content of the user 80 carrying with the self ball 100 is stored in the interest level storage unit 124 in association with individual content. The interest level is a numerical value indicating strength of interest degree, and is expressed by an integer value from 0 to 100 for instance. Instances of the content include an image such as the still image or the moving image displayed in the digital signage system 200, a project carried out in the project room 35, and an article in the shared work space 10. In addition, since a person with whom the user 80 meets in the shared work space 10 can be also an interest target of the user 80, a person may be considered as one of the contents. In the instance of the drawing, the data (the image data in the instance of the drawing) of the content is registered in the "content" field of the database of the interest level storage unit 124. However, the image data is given as merely exemplary. An ID (identification information) uniquely assigned to the content may be registered in the field in place of the image data. In the case of the interest level with respect to the content unlike the data such as an article, a project, and a person, the ID (for instance, a project ID and a user ID) of the content or an image obtained by capturing the content may be registered in the "content" field.

In addition, in the instance of the drawing, one or more keywords relating to the contents, and the interest levels of the respective contents may be registered in the database. The keyword relating to the content is a word representing an important one of various concepts for expressing the content. The information of the keyword relating to the content is stored in a device (for instance, the lounge system 400) obtaining the interest level or in a server on the network which is accessible from the device. In addition, the information to be used for obtaining the interest levels with respect to the respective relating keywords from the interest levels of the contents (for instance, a coefficient which is multiplied to the interest level of the content to obtain the interest level of the keyword) is also stored in a device which obtains the interest level or in a server which is accessible from the device. The device such as the lounge system 400 which obtains the interest level determines the interest level of the user 80 with respect to the content (for instance, the image content displayed in the device) corresponding to the device based on the data obtained from a sensor other than the camera. Further, the device applies the information on these keywords to the interest level to calculate the interest levels with respect to the respective keywords. Then, the interest level with respect to the obtained content and the interest level information on the respective keywords are transmitted from the device to the interest level acquisition unit 122 of the self ball 100, and registered in the interest level storage unit 124. Since there is also a case where the different contents are associated to the same keyword, the interest level of the user 80 with respect to the keyword is obtained such that the interest levels with respect to the keyword shown in a record of the respective contents stored in the interest level storage unit 124 are summed (for instance, a total sum) in the plural contents.

In this specification, information such as these content and terminology like a content of the information and a terminology indicating the content (for instance, some keywords representing the content), or another information different from the information such as these content and terminology but related to the information like an information content reminded from these content and terminology will be collectively referred to as a "theme". Instances of the theme include the content itself, the keyword itself, a concept to which the content and the keyword belong, a concept related to the content and the keyword. For instance, in the case of a content such as a leaflet image for inviting to join a sandlot baseball team as a member, the concept such as "baseball" and "sports" to which the content belongs is an instance of the "theme". In a case where the concept corresponding to the content and the keyword is set to the "theme", the information which associates the content and the keyword with the "theme" is managed in a database to which the self ball 100 and a server 600 of the second exemplary embodiment described below are accessible.

In the above instance, the target of the interest level has been restricted to an object in the shared work space 10 such as the content displayed in the digital signage system 200 and the project in the project room 35, but this is given as a mere instance. Otherwise, the interest theme of the user 80 may be extracted from the information (for instance, a posted article) which is registered to a service on the Internet such as SNS (Social Networking Service) and made public. In this case, the interest level acquisition unit 122 collects the posted information of the user from the SNS using the user ID of the user 80 in the SNS for instance. The keyword and the image content of a picture are extracted from the collected information. The interest level of the user 80 with respect to the keyword and the image content is calculated from a frequency of appearance of the keyword and the content of a caption with respect to the image content. Therefore, in this instance, the theme (the keyword) obtained from an information source (for instance, the SNS) other than the shared work space 10 and the interest level of the user 80 with respect to the theme are also registered to the interest level storage unit 124.

The ball driving control unit 126 controls the driving mechanism 118 which drives the self ball 100. For instance, the ball driving control unit 126 controls the driving mechanism 118 such that the self ball 100 approaches the self ball 100 of another user according to an instruction from the communication promotion processing unit 140. Alternatively, the driving mechanism 118 is controlled to vibrate the self ball 100.

The light emission control unit 128 controls the emission intensity of the light-emitting mechanism 116 in the self ball 100. For instance, the light emission control unit 128 instructs the emission intensity to the light-emitting mechanism 116 according to the interest level recently acquired by the interest level acquisition unit 122.

The ball expression control unit 130 controls the display device which displays the eyes 150 of the self ball 100, and forms the expression of the eyes 150. For instance, when detecting that the self ball 100 is set to the charger, the ball expression control unit 130 sets the shape of the eyes 150 displayed in the display device to be the shape of the sleepy eyes (for instance, one line horizontally extending). When the self ball 100 is detached from the charger, the ball expression control unit 130 sets the shape of the eyes 150 to be a black circle. The size (diameter) of the black circle is controlled according to the interest level recently acquired by the interest level acquisition unit 122 (for instance, the size of the eyes 150 becomes large as the interest level is increased).

The projection control unit 132 controls the projector 110 to display an image such as the still image and the moving image. The projection control unit 132 projects, for instance, the image instructed from the communication promotion processing unit 140 to the projector 110.

The communication promotion processing unit 140 executes a process of motivating a communication (for instance, conversation) between the users 80 having a common interest (in other words, the users sympathize with the interest target). The communication promotion processing unit 140 includes a proximity user recognition unit 141, a user state determination unit 142, an attention theme determination unit 144, a proximity user information communication unit 146, and a motivating operation instruction unit 148.

The proximity user recognition unit 141 recognizes another self ball 100 (that is, another user) which approaches the subject self ball 100. A situation that a second self ball 100 "approaches" a first self ball 100 means that the second self ball 100 is positioned in a predetermined range from the first self ball 100. Herein, the "range" is a range with respect to a distance between the two (that is, two self balls 100). The "range" (or "threshold") is not always determined as a constant value, but can be changed according to a circumstance where the two are placed. For instance, in a scheme where whether these two approach each other is determined whether these two can make a communication through radio waves such as Bluetooth described below, the communication between the two can be made ("approaching") or not ("not approaching") depending on a radio wave situation when an environment where the two are placed is different even in a case where an actual physical distance between the two is exactly equal. In addition, it is well known that the distance measured between the two by the radio wave (for instance, BLE described below) is changed at every measurement according to a change in the radio wave situation even when the actual physical distance between the two is exactly equal. Therefore, in an instance where the two are recognized to approach each other in a case where these first and second self balls 100 can communicate to each other, the fact that the two can communicate to each other means that the two are "in a predetermined range". In an instance where the distance between the first and second self balls 100 is measured to determine whether the two approach each other, it is determined that the two are "in a predetermined range" when the distance measured by a medium (for instance, BLE) used in the distance measurement (the distance may be different from the actual physical distance measured by a ruler or an optical measurement device) falls within a predetermined threshold range.

As an instance, the proximity user recognition unit 141 tries to communicate with the similar wireless communication device of another self ball 100 using a wireless communication device having a relative small (for instance, about 1 meter) communication range (effective range) which is provided in the transmission/reception unit 102. Then, in a case where the communication is successful, it is determined that the self ball 100 of the communication correspondent approaches the subject self ball ("within a predetermined range"). For instance, the communication range of Class 3 of Bluetooth is defined about 1 m. A Bluetooth communication device classified into Class 3 may be provided in the transmission/reception unit 102 as a device for detecting the approaching self ball 100. In a case where the Bluetooth communication devices of two self balls 100 can make a communication, it is determined that the two approach each other. A distance where the Bluetooth communication devices can make a communication is changed not only by the output class but also by a radio wave situation of the environment. Therefore, "about 1 meter" is a mere criterion. The self ball 100 may exchange data using the Bluetooth communication device with the self ball 100 of the communication correspondent after the approach is detected. Another communication device such as a wireless LAN may be used for the communication with another system such as the digital signage system 200. The distance "about 1 meter" which is a criterion for determining the approach, and the use of Class 3 of Bluetooth are also given as merely exemplary. Another distance value may be used as the threshold for determining the approach. A wireless communication device having the output class according to the threshold may be used for determining the approach. In addition, as another instance, the lounge system 400 obtains a distance between the self balls 100 on the table 45 from an image obtained by capturing the upper surface of the table 45 using the camera, and the distance information may be notified to the self ball 100. In this case, when the notified distance is equal to or less than the threshold, the proximity user recognition unit 141 determines that there is a self ball 100 approaching the user's self ball 100.

In addition, BLE (Bluetooth Low Energy) defined in Bluetooth 4.0 has a function of estimating a distance between the devices communicating to each other from a radio wave intensity in communication. In a case where the transmission/reception unit 102 includes a transmission/reception device in conformity to BLE, a distance to the other self ball 100 paired in Bluetooth communication is estimated by the function of BLE. In a case where the estimated distance falls within a predetermined threshold, the proximity user recognition unit 141 may recognize that the "other self ball" 100 "approaches" the user's self ball 100 (that is, "falling within a predetermined range").

The user state determination unit 142 determines a psychological state of the user 80 carrying out the self ball 100, in particular, a state where the user wants to communicate with other users (that is, a state of wanting to receive "notification" by the motivating operation instruction unit 148 described below), or not (that is, a state of not wanting to receive "notification"). In an instance, the actual process of the determination is performed by the lounge system 400 (the details are described below). The user state determination unit 142 of the self ball 100 acquires a process result of the lounge system 400 and performs the determination based on the process result. The determination may be performed in consideration of biometric information such as pulses of the user 80 detected by the wearable device.

The attention theme determination unit 144 determines a theme (referred to as an attention theme) in which the user 80 carrying with the self ball 100 is strongly interested (in other words, attention). The attention theme is a theme of which the interest level is equal to or more than the threshold in the data stored in the interest level storage unit 124. The threshold used in determination is set in the attention theme determination unit 144 in advance. The determination on the attention theme may be performed at a content level, or may be performed at a keyword (concept) level. For instance, in a case where the determination is performed at the content level, a content of which the interest level is equal to or more than the threshold among the contents stored in the interest level storage unit 124 is determined as the attention theme. In addition, those having the interest level equal to or more than the threshold based on both content and keyword levels may be determined as the attention theme. An extraction range (such as the content level, the keyword level, both of these levels, or a level of the concept to which the content and the keyword belong) of the attention theme is set in each self ball 100 in advance.

The proximity user information communication unit 146 receives information of the attention theme (which is obtained by the approaching self ball 100 recognized by the proximity user recognition unit 141) of the counterpart user from the self ball 100. Alternatively, the proximity user information communication unit 146 may transmit the information of the attention theme of the user obtained by the attention theme determination unit 144 to the self ball 100 of the counterpart user. It is enough to supply the information of the attention theme from one of two approaching self balls 100 to the other one. For instance, the user's self ball 100 is negotiated with the other approaching self ball 100 when the wireless communication starts therebetween, and thus one of them is determined as a master device. A slave device notifies the information of the attention theme of its user to the master device. The information of the notified attention theme is the identification information of the attention theme (for instance, the ID of the content). In a case where the attention theme is the keyword, the keyword itself may be notified as the information of the attention theme. In the master device which receives the information of the attention theme from the slave device, the motivating operation instruction unit 148 described below collates the attention themes of the slave device and the master device, and obtains a common attention theme (a theme of a sympathized target) of a slave device user and a master device user.

The motivating operation instruction unit 148 compares an attention theme group obtained by the attention theme determination unit 144 with an attention theme group indicated by the information of the attention theme received from the approaching self ball 100. When the two has the common attention theme, the communication promoting operation is executed. The communication promoting operation is an operation of a notification operation of notifying that the user corresponding to the self ball 100 and the other user (that is, a user within a predetermined range) approaching the user are interested in a common theme. The notification operation becomes a motivation for communication between these users.

As a specific instance of the communication promoting operation (that is, "notification operation"), there is an operation of moving the user's self ball 100 on the table forward in a direction to the approaching counterpart's self ball 100. The operation that the user's self ball 100 approaches the counterpart's self ball 100 is easily understood as an operation of initiating the communication with the counterpart.

In this instance, the motivating operation instruction unit 148 instructs the ball driving control unit 126 to move while rotating forward in the direction to the counterpart's self ball 100. At this time, the direction to the counterpart's self ball 100 is obtained from the image obtained by capturing the upper side of the table 45 by the lounge system 400 for instance. The direction may be notified to the respective self balls 100 (or one of the two approaching self balls 100). As another instance, the self ball 100 itself may obtain the direction where there is the counterpart's self ball 100 to which the self ball approaches. In this case, a sensor having directivity may be used to detect the counterpart's self ball 100. The camera 106 may be used as the sensor having the directivity. For instance, the ball driving control unit 126 slowly rotates the self ball 100 about an axis perpendicular to the horizontal surface while maintaining the camera 106 almost in the horizontal state. Then, the motivating operation instruction unit 148 retrieves a circular (or a spherical in consideration of a shadow) object having a size within a certain range from the moving image captured by the camera 106 at that time. When there is such an object, the motivating operation instruction unit 148 recognizes that the object is the counterpart's self ball 100, and instructs the ball driving control unit 126 to move forward in the direction of the counterpart's self ball 100 as a movement direction.

The rotational movement of the self ball 100 as the communication promoting operation may be performed only one (for instance, only the master device) of the two self balls 100 approaching each other.

As another instance of the communication promoting operation, the self ball 100 may be vibrated. In this case, the motivating operation instruction unit 148 instructs the ball driving control unit 126 to execute a vibrating operation.

As still another instance, the communication promotion may be promoted by a light-emitting pattern of the self ball 100. For instance, the self ball 100 performs the light emission defined in advance as a motivation of the communication such as flashing or emitting a specific color different from that at the normal time, so that it is transferred to the user that there is a motivation of the communication. In this instance, the motivating operation instruction unit 148 instructs the light emission control unit 128 to emit the light in a pattern (flashing and a specific color) defined in advance as the light-emitting pattern for motivating the communication.

As still another instance of the communication promoting operation, the projector 110 projects an image related to the common attention theme (hereinafter, referred to as "common theme") between these two users. In this instance, the motivating operation instruction unit 148 causes the ball driving control unit 126 to control the posture of the self ball 100 such that a projection direction of the projector 110 becomes a direction (for instance, a direction in which the projector can make a projection onto the upper surface of the table where the self ball 100 placed) defined in advance. Then, image data related to the common theme is supplied to the projection control unit 132, and projected from the projector 110.

In a case where the common theme is a content, the image itself of the content (the still image or the moving image), a representative image of the content (for instance, in a case where the content is the moving image), and a thumbnail image of the content may be used as instances of the projecting image related to the common theme. In a case where the content of the common theme is a multimedia content accompanying with a voice, the voice may be output from the speaker 112 at the same time of projecting the image. In a case where the common theme is a keyword, a character string of the keyword may be projected as the image related to the common theme. In addition, the image related to the keyword of the common theme is searched by a search engine on the Internet, and an image obtained as a result of the search may be projected. When the self balls 100 of two users who are determined as having the common theme project the same images (for instance, on the table surface), the two users who see these images can recognize that they are mutually interested in the same theme. The common recognition can become a motivation causing the two users to start a conversation.

As still another instance of the communication promoting operation, a voice related to the common theme may be output from the speaker 112. As the voice related to the common theme, there are a voice component of a content (the common theme), a representative voice of the content (a theme music and a catchphrase) of the content, and a reading voice of a keyword (the common theme).

The description has been made with some instances of the communication promoting operation. Some of the above instances may be collectively executed as the plural communication promoting operations.

Figure 10:
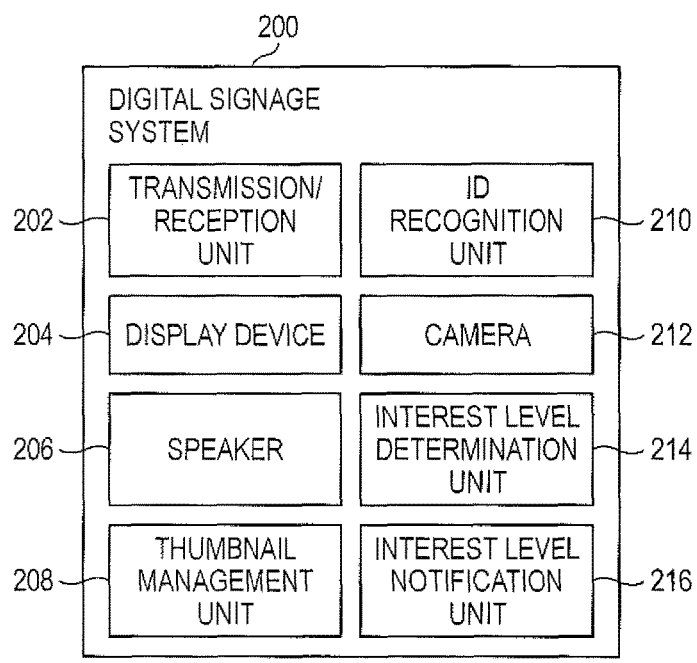
FIG. 10 is a diagram illustrating an exemplary functional configuration of the digital signage system.

Next, an exemplary functional configuration of the digital signage system 200 will be described with reference to FIG. 10.

The digital signage system 200 includes a transmission/reception unit 202, a display device 204, a speaker 206, a thumbnail management unit 208, an ID recognition unit 210, a camera 212, an interest level determination unit 214, and an interest level notification unit 216.

The transmission/reception unit 202 is a device for performing the wireless communication with the self ball 100. Therefore, the transmission/reception unit 202 has a function of performing the wireless communication in conformity to a wireless communication standard such as a wireless LAN or Bluetooth (registered trademark). The transmission/reception unit 202 includes plural wireless communication devices for the communication in other wireless communication standards, and may differently use the respective communication devices according to its purpose. In addition, the transmission/reception unit 202 may have a function of communicating with the other devices (for instance, the lounge system 400 and other servers) in the shared work space 10 and the server on the Internet through a local network in the shared work space 10. As an instance of the server with which the digital signage system 200 communicates, there is a server which recognizes an oral question from the user 80 and makes a reply (for instance, text data, voice data, or a web page as a reply) to the question.

The display device 204 is a device which displays the image of the content, and there are a liquid crystal display and an organic EL (electroluminescence) display as an instance thereof.

The speaker 206 is a device which outputs a voice of the content. In a case where the digital signage system 200 has a function of responding to the oral question from the user 80, an oral reply is output from the speaker 206. While not illustrated in the drawing, the digital signage system 200 in this case includes a microphone through which the voice of the user is detected.

The thumbnail management unit 208 manages a content presentation by the display device 204 and the speaker 206. For instance, the thumbnail management unit 208 includes plural contents to be presented and information of a schedule (time table) to present these contents. The thumbnail management unit 208 outputs the respective contents to the display device 204 and the speaker 206 according to the schedule.

The ID recognition unit 210 recognizes the user ID stored in the user ID storage unit 104 of the self ball 100 of the user 80 neighboring the digital signage system 200 (in particular, the display device 204). The self ball 100 of "the neighboring user" may be similarly detected by whether the self balls 100 approach each other, and may be detected by whether the wireless communication restricted in the communication range (for instance, Class 3 of Bluetooth) can be made. In other words, in a case where the transmission/reception unit 202 establishes the communication with the self ball 100 through the wireless communication restricted in the communication range, the ID recognition unit 210 acquires the user ID from the self ball 100 through the transmission/reception unit 202. As another instance, the user ID storage unit 104 of the self ball 100 is configured as an RFID (Radio Frequency Identification) tag. The ID recognition unit 210 may read the user ID stored in the tag through an RFID tag reader. The ID of the self ball 100 of the neighboring user can be acquired using an RFID tag having an appropriate communication range. In addition, the ID recognition unit 210 measures a distance from the digital signage system 200 to the self ball 100 using a distance measuring function defined in BLE. The ID recognition unit 210 determines the self ball 100 of which the distance falls within a predetermined threshold as the self ball 100 neighboring the digital signage system 200, and may recognize the user ID of the self ball.

The camera 212 is an image capturing device of which the field of view is limited to the forward side of the display device 204. In the system, it is determined whether the user 80 pays attention to the content displayed in the display device 204 or simply stands in front of the display device 204 from the state (for instance, a body, a face, and a line-of-sight direction) of the user 80 shown in the image (for instance, the moving image) captured by the camera 212. The determination result is used as a material for obtaining the interest level of the user with respect to the content. There may be provided plural cameras 212 of which the field of view is limited to the front side of the display device 204 from various angles. Therefore, the line-of-sight direction of the user 80 may be collectively evaluated from the captured images of the plural cameras 212.

The interest level determination unit 214 obtains the interest level of the user 80 with respect to the content displayed in the display device 204. The interest level is determined from a time period when the user 80 pays attention to the content displayed in the display device 204, for instance. It is determined that the interest level is high as the attention time is long. The determination on whether the user 80 pays attention to the content displayed in the display device 204 may be made from the state of the user 80 shown in the image captured by the camera 212 as described above. Various techniques are proposed as a technique of detecting the face and the eyes of a person from the image. With the use of such a technique, it is possible to determine whether the line-of-sight of the user 80 in the image captured by the camera 212 faces the display device 204. In a case where it is determined that the line-of-sight of the user faces the display device, it may be determined that the user 80 pays attention to the content. The length of the attention time of the user 80 onto the displayed content is accumulated. The accumulated value is applied to a predetermined calculation formula (for instance, multiplying a coefficient to the accumulated value) so as to obtain the interest level.

In a case where there are plural users 80 in front of the display device 204, these users 80 are necessarily identified. The identification may be performed based on the image captured by the camera 212. For instance, in a case where there are found plural user IDs during the identification of the ID recognition unit 210, the interest level determination unit 214 instructs the self balls 100 corresponding to the recognized respective user IDs to emit the light in specific emission patterns different from each other (for instance, colors different from each other and flashing patterns different from each other) through the transmission/reception unit 202. Alternatively, the user IDs of the respective self balls 100 in the captured image can be specified by causing the self balls 100 corresponding to the respective user IDs to emit the light in an order at a different timing.

When the emission patterns of the respective self balls 100 are identified from the image captured by the camera 212, the users 80 having the respective self balls 100 are identified. Therefore, it is possible to identify the user IDs of the respective users 80 in the image. It is possible to determine whether these users 80 pay attention to the content in the displayed image.

The external surfaces of the respective self balls 100 are set to have unique patterns, and the patterns are identified from the image captured by the camera 212. In this way, the self balls 100 in the image may be identified (that is, the user IDs of the self balls 100 are identified). In this case, since the user ID is specified from the pattern of the surface of the self ball 100, there is no need for the self ball 100 to include the user ID storage unit 104 for storing the user ID as electronic data. The pattern of the surface of the self ball 100 may be an image code such as a bar code indicating a unique ID of the ball, but the pattern is not limited thereto.

The interest level determination unit 214 may reflect a reaction from the user 80 with respect to the displayed content to the interest level. For instance, in a case where a question from the user 80 with respect to the displayed content (for instance, the oral question as described above), the interest level determination unit 214 increases the interest level of the user 80 with respect to the content by a predetermined value. In addition, for instance, in a case where the display device 204 is configured with a touch panel and the user 80 performs a touch operation such as expansion on the display device 204, the interest level of the user 80 with respect to the content is increased by a predetermined value corresponding to the type of the operation. In a case where another content linked to the content is called through a touch operation, the interest levels of the user 80 with respect to a calling-source content and a called-destination content are increased by a predetermined value.

The interest level notification unit 216 notifies the interest level information obtained by the interest level determination unit 214 to the self ball 100 through the transmission/reception unit 202. The information (referred to as "notification information") to be notified to the self ball 100 by the interest level notification unit 216 includes, for instance, the user ID of the self ball 100 at the recipient, information (for instance, the data of the content, an ID of the content, or both of them) of a target content of the interest level, and the obtained interest level. In a case where the user ID stored in its user ID storage unit 104 is matched to the user ID included in the notification information, the self ball 100 received the notification information registers the content and the interest level in the notification information in pair in the interest level storage unit 124. In a case where the content in the notification information is already registered in the interest level storage unit 124, the value of the interest level of the registered content is updated to the value of the interest level contained in the notification information. In a case where the transmission/reception unit 202 of the digital signage system 200 can individually communicate with each self ball 100, the obtained interest level and the information of the content may be transmitted to a communication address (recipient) of the transmission/reception unit 102 of the self ball 100 corresponding to the user ID which corresponds to the interest level of the interest level determination unit 214.

The interest level notification unit 216, for instance, periodically notifies the notification information indicating the interest level of the user 80 corresponding to the displayed content at that time point to the self ball 100 during a period when the communication with the self ball 100 is possible.

Figure 11:
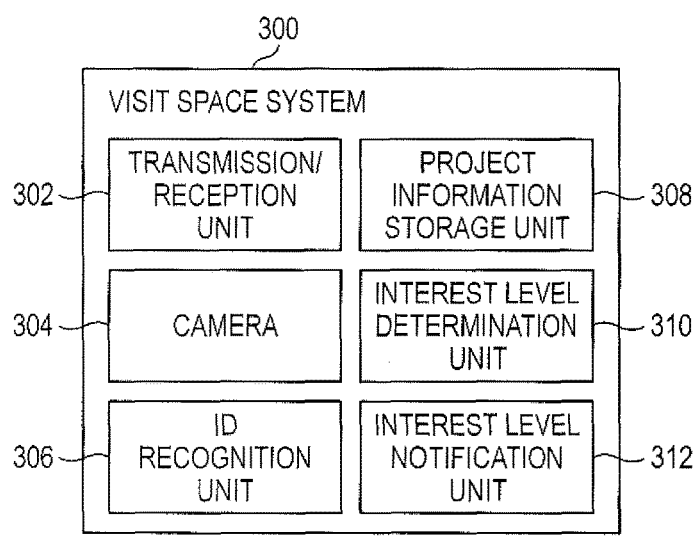
FIG. 11 is a diagram illustrating an exemplary functional configuration of a visit space system.

Next, an exemplary functional configuration of the visit space system 300 will be described with reference to FIG. 11. The visit space system 300 includes a transmission/reception unit 302, a camera 304, an ID recognition unit 306, a project information storage unit 308, an interest level determination unit 310, and an interest level notification unit 312.

The visit space system 300 is a system for obtaining the interest level of the user 80 in the visit space (where the user can visit the project room 35 to look at the situation therein)

with respect to a project (for instance, a conference or a work of participants) carried out in the project room 35. The interest level with respect to the project may be obtained by the same method as that of the interest level with respect to the content in the digital signage system 200 described above. In other words, it is determined whether the user 80 in the image gazes into the project room 35 from the image captured by the camera 304. The interest level of the user 80 with respect to the project carried out in the project room 35 is calculated from a value obtained by accumulating a gazing time.

The roles and functions of the transmission/reception unit 302, the camera 304, and the ID recognition unit 306 are similar to those of the transmission/reception unit 202, the camera 212, and the ID recognition unit 210 of the digital signage system 200. However, the camera 304 is provided in the visit space 30 at a position in a field of view where the user 80 looking into the project room 35 is contained. Plural cameras 304 may be provided. The inside of the visit space 30 is captured in various direction using the plural cameras 304, and the line-of-sight directions of the respective users 80 may be determined from the captured result.

The project information storage unit 308 stores information for specifying the project currently executed in the project room 35. Instances of such information include a schedule (time table) of the projects carried out in the project room 35. The identification information (the project ID) of the project currently carried out in the project room 35 can be obtained from the schedule and the current point of time. It is a matter of course that the information stored in the project information storage unit 308 is the project ID itself of the project currently carried out in the project room 35. The visit space system 300 may acquire the ID of the project currently carried out in the project room 35 from a server which manages a schedule of a project room group in the shared work space 10 in place of the project information storage unit 308.

The interest level determination unit 310 obtains the interest level of the user 80 with respect to the project executed in the project room 35 from the image captured by the camera 304 through the same method as that of the interest level determination unit 214 of the digital signage system 200 as described above. For instance, it is determined whether the respective users 80 gaze into the project room 35 from the captured image. The interest levels of the respective users 80 are calculated from time lengths that the respective users 80 gaze. The user ID of each of the users 80 in a case where the plural users 80 are shown in the image of the camera 304 may be specified by the same method as that of the digital signage system 200.

The interest level notification unit 312 notifies the information (the project ID and/or the representative image) of the project currently carried out in the project room 35 obtained from the information stored in the project information storage unit 308, and the interest level obtained by the interest level determination unit 310 toward the self ball 100 of the user who is a target of the interest level. The user ID may be contained in the notification to be broadcasted.

Next, an exemplary functional configuration of the lounge system 400 will be described with reference to FIG. 12. A main role of the lounge system 400 is to determine whether the user 80 in the lounge 40 is in a "communication evasion state", and to notify the determination result to the self ball 100 of the user 80. The communication evasion state is a state where the user 80 does not want to receive a notification suggesting that the user 80 is interested in a theme common to that of other users. The notification is made in a form of the communication promoting operation (for instance, the ball moves toward the counterpart) of the self ball 100, and the motivation of the communication with the counterpart is induced. Therefore, the state of not wanting to receive such a notification is a state of evading the communication with other users.

The communication evasion state of the user 80 is determined from an expression of the face of the user 80, a posture of the body, or a behavior captured by a camera 404 for instance. For instance, in a case where the user makes a deeply-lined forehead, shows a behavior focusing on something, or turns toward the opposite direction to the counterpart, it is considered that the user is in the communication evasion state. It is determined whether the user 80 is in the communication evasion state by detecting such a state of the user 80 from the image. As a method of detecting whether the user 80 is in the communication evasion state from the image of the user 80, for instance, a method disclose in any one of the following documents (a) and (b) may be employed:

(a) Yuichi Watanabe, Tomoko Endo, Naoki Takegawa, "Recognition of Moving Image of Face To/Against Communication", Japanese Academy of Facial Studies, Issue on Sep. 8, 2011, Vol. 11, No. 1, 165 page; and (b) Kitajima Yuki, "Estimation of Conversation Desire of Participant based on Face Information and Head Posture", Graduation Thesis of the Faculty of Information and Computer Science in Chiba Institute of Technology, 2014.

In this instance, the description has been made about that the communication evasion state of the user 80 is determined from the image of the camera 404 which captures the user 80. The determination may be performed based on the information from an information source other than the camera 404. As an instance of the information source other than the camera 404 used in the determination, there is schedule information of the user 80. For instance, in a case where it is found out that the user 80 participates in a conference immediately before a time point when the determination is performed (for instance, within a predetermined time going back from the time point) from the schedule information, the user 80 is more likely to want to take a rest without conversation with other persons because the user 80 is tired. Therefore, in such a case, it is determined that the user 80 is in the communication evasion state. Similarly, in a case where the user 80 is scheduled to participate in the conference immediately after a time point of the determination (for instance, within a predetermined time from the time point), the user 80 is more likely not to be disturbed from other persons except the conference. Therefore, in that case, it is determined that the user 80 is in the communication evasion state. Herein, the conference has been described as an instance, but even other types of events generally considered as more demanding for the user 80 may be similarly determined. The schedule information of the user 80 may be obtained from a schedule management system in the shared work space 10 or on the Internet. Such a determination may be performed by a user state determination unit 408 of the lounge system 400 or the user state determination unit 142 of the self ball 100.

In addition, as still another instance of the information source, there is vital data (for instance, a pulse rate and a body temperature) of the user 80 which is obtained from a sensor provided in the wearable device equipped by the user 80 and the self ball 100. For instance, in a case where the state of the user 80 which can be estimated from the vital data is a state in which the user is not much suitable to the conversation with other persons due to fatigue and tension, it is determined that the user 80 is in the communication evasion state. The determination may be performed by the user state determination unit 142 of the self ball 100.

The description has been made about some instances of the method of determining the communication evasion state. The user state determination unit 408 of the lounge system 400 and the user state determination unit 142 of the self ball 100 determine whether the user 80 is in the communication evasion state using the method described above and one or more other similar methods.

Figure 12:
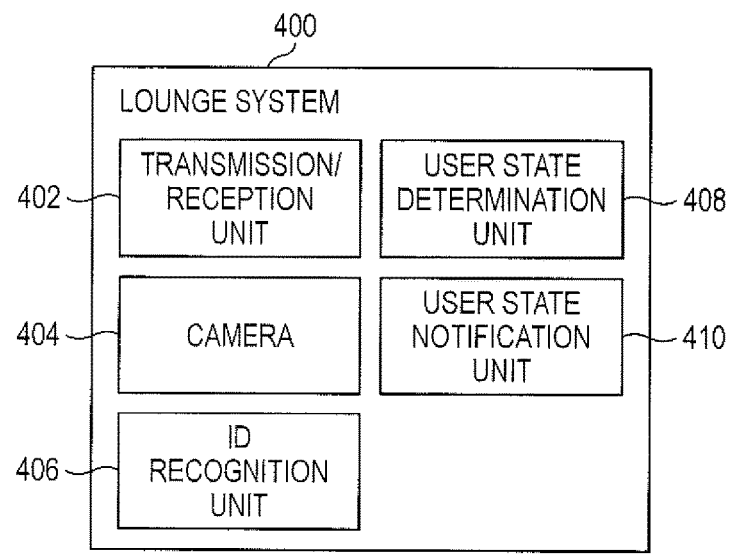
FIG. 12 is a diagram illustrating an exemplary functional configuration of a lounge system.

The lounge system 400 illustrated in FIG. 12 includes a transmission/reception unit 402, the camera 404, an ID recognition unit 406, the user state determination unit 408, and a user state notification unit 410.

The roles and functions of the transmission/reception unit 402, the camera 404, and the ID recognition unit 406 are similar to those of the transmission/reception unit 202, the camera 212, and the ID recognition unit 210 of the digital signage system 200. However, plural cameras 404 are provided as needed such that the expressions of the faces and the behaviors of the respective users 80 surrounding the table 45 in the lounge 40 are captured. In an example where the movement direction for the communication promoting operation is notified from the lounge system 400 to the self ball 100 on the table 45 in the lounge 40, the camera 404 is provided even at a position where an image which can specify the positions of the respective self balls 100 on the table 45 can be captured (for instance, just on the table 45). The positions of the respective self balls 100 on the table 45 may be specified using the principle of triangulation from the images obtained by capturing the upper surface of the table 45 in different directions by the plural cameras 404. Herein, the plural self balls 100 in the images may be identified by the same method (the method of causing the respective balls to emit the light with individual patterns, or identifying the unique pattern of the surface of each ball) as the above-described method of identifying the respective users 80 in a case where there are the plural users 80 near in front of the display device 204 of the digital signage system 200.

The user state determination unit 408 determines whether the user is in the communication evasion state from the expression of the users 80 around the table 45 captured by the camera 404. The user state notification unit 410 notifies the result of the determination to the corresponding self ball 100. The information notified by the user state notification unit 410 includes, for instance, the user ID of the determination target user and the determination result (for instance, a value indicating whether it is the communication evasion state). The user ID is a user ID of the self ball 100 nearest to the determination target user in the captured image.

The image of the user 80 captured by the camera 404 of the lounge system 400 has been used as a material used when the expression of the user 80 is analyzed to determine the communication evasion state, but an image obtained by capturing the user 80 using the camera 106 of the self ball 100 of the user 80 may be used alternatively or additionally. For instance, the user state determination unit 142 may determine whether the user 80 is in the communication evasion state using the same method as that of the user state determination unit 408 of the lounge system 400 from the image of the user 80 captured by the camera 106. In addition, the user state determination unit 142 may comprehensively evaluate own determination result and the determination result of the user state determination unit 408 of the lounge system 400 to finally determine whether the user 80 is in the communication evasion state. In order to make the camera 106 of the self ball 100 face toward the user 80, a relative direction with respect to the self ball 100 of the corresponding user may be notified to the self ball 100 from the lounge system 400. The notification direction may be calculated from a positional relation between the self ball 100 and the user 80 in the image captured by the camera 404.

In addition, the user state determination unit 408 may obtain the interest level with respect to each other of the users 80 around the table 45. The interest level of the user with respect to the other user is obtained by another method and another measurement different from that of the interest level of the user with respect to the content. The interest level of the user 80 (referred to as a first user) with respect to the other user 80 (referred to as a second user) is obtained from the expression of the face or the behavior when viewing the second user or thereafter, or from an attitude with respect to the second user shown by the first user. For instance, in a case where the expression of the face of the first user is shaded or the direction of the body or the face is changed (escaping the second user's eyes) when the first user saw the second user, the interest level of the first user with respect to the second user is decreased. A falling degree may be determined according to the expression or the type of the behavior. On the contrary, in a case where the first user gazes the second user or repeatedly looks furtively at the second user many times, the interest level of the first user with respect to the second user is increased. A rising degree may be determined according to the expression or the type of the behavior. Whether the first user looks at the second user may be determined by obtaining the line-of-sight direction of the first user from the image captured by the camera 404 (or the plural cameras 404). In addition, the expression and the behavior of the first user may be obtained by analyzing the states of the face and the body of the user 80 in the image. When the user 80 enters the lounge 40, the interest levels of the user 80 with respect to the other users each are set to a predetermined initial value. Thereafter, the interest level may be increased or decreased whenever the expression and the behavior matched to the above-described conditions. Among the interest levels of the user 80 with respect to the other users 80 obtained by the user state determination unit 408, the user state notification unit 410 notifies particularly a value of the interest level with respect to the user 80 (that is, the other user 80 having the self ball 100 detected as approaching to the self ball 100 of the subject user 80) approaching to the subject user 80 toward the self ball 100 of the subject user 80. The notification may be used as a material for determining whether the self ball 100 performs the communication promoting operation.

Figure 13:
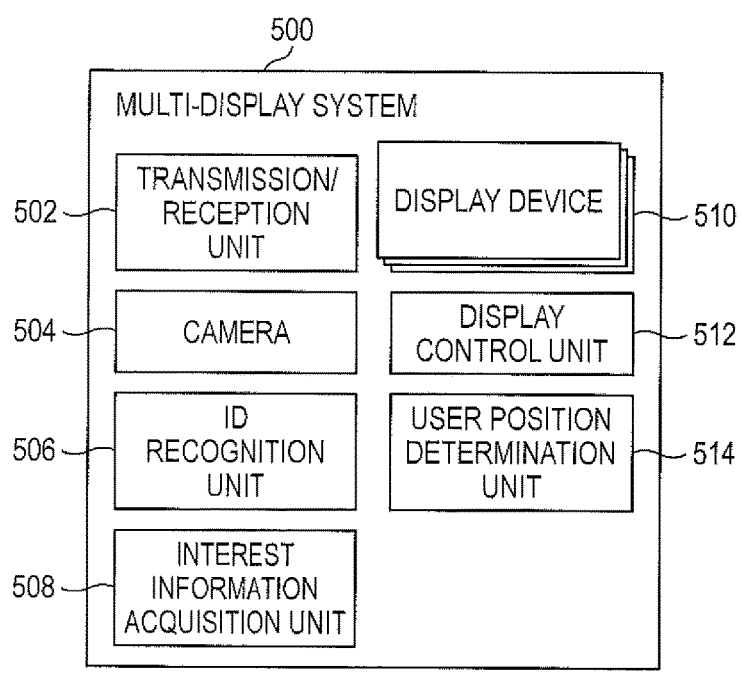
FIG. 13 is a diagram illustrating an exemplary functional configuration of the multi-display system.

Next, an exemplary functional configuration of the multi-display system 500 will be described with reference to FIG. 13. A main role of the multi-display system 500 is to display a list of information related to the themes having a high interest level of the user in the plural display devices 510.

The multi-display system 500 includes a transmission/reception unit 502, a camera 504, an ID recognition unit 506, an interest information acquisition unit 508, the plural display devices 510, a display control unit 512, and a user position determination unit 514. The plural display devices 510 (hereinafter, referred to as a "multi-display") are arrange in a lattice shape (grid pattern) in the wall surface. For instance, the respective display devices 510 may be used as one display having a large-sized screen, or may display individual images.

The roles and the functions of the transmission/reception unit 502, the camera 504, and the ID recognition unit 506 are similar to those of the transmission/reception unit 202, the camera 212, and the ID recognition unit 210 of the digital signage system 200. Plural cameras 504 are provided as needed in order to capture the users 80 in front of the multi-display. The image captured by the camera 504 is used to detect a position of the user 80 with respect to the large-sized screen configured with the group of the display devices 510. When a relative position of the camera 504 with respect to the multi-display and the line-of-sight direction of the camera 504 are confirmed, the position of the user 80 with respect to the multi-display can be calculated from the position of the user 80 in the image captured by the camera 504.

The interest information acquisition unit 508 acquires the interest level information of the respective themes stored in the interest level storage unit 124 of the self ball 100 from the self ball 100 (which is recognized by the transmission/reception unit 502 and the ID recognition unit 506) of the user 80 near in front of the multi-display. The acquired information is, for instance, the identification information of the respective themes (for instance, the ID of the content and the keyword) and the interest level.

The display control unit 512 controls each of the plural display devices 510 configured with the multi-display. The display control unit 512 instructs the respective display devices 510 about an image content to be displayed. For instance, the display control unit 512 assigns and displays information on some themes in a descending order of the interest level to the respective display devices 510 based on the interest level information of the user 80 near in front of the multi-display which is acquired by the interest information acquisition unit 508. The displaying information is a content having a high interest level, a keyword having a high interest level, an image and a web page retrieved with the keyword having a high interest level, and other contents associated in advance to the content and the keyword having a high interest level. The display control unit 512 also has a function of displaying the image content in the plurality (for instance, adjacent 2×2 or 3×3) of display devices 510 as one screen. For instance, the theme having the highest interest level is displayed such that the information of the theme is assigned to a large-sized screen area formed in the plural display devices 510. In addition, the display control unit 512 may perform a control such that the information of the theme having the highest interest level of the user 80 is displayed in a portion of the multi-display near the position of the user 80 which is obtained by the user position determination unit 514.

Partitions of the plural display screens displayed in the multi-display may be not matched to the partitions of physical screens of the respective display devices 510. Some of the plural display screens for displaying different contents may be contained in the physical screen of one display device 510. In addition, a display device having a single large-sized screen may be provided in place of the multi-display, and the large-sized screen may be divided into plural small screens to display the plural images.

The user position determination unit 514 determines a relative position of the user 80 with respect to the multi-display. For instance, the position of the user with respect to the multi-display in the actual space may be calculated from the position of the user 80 in the image captured by the camera 504.

The configuration of the system of the first example has been described. Next, an exemplary process for the communication promotion between the users 80 in the lounge 40 which is realized by the system will be described with reference to FIG. 14.

Figure 14:
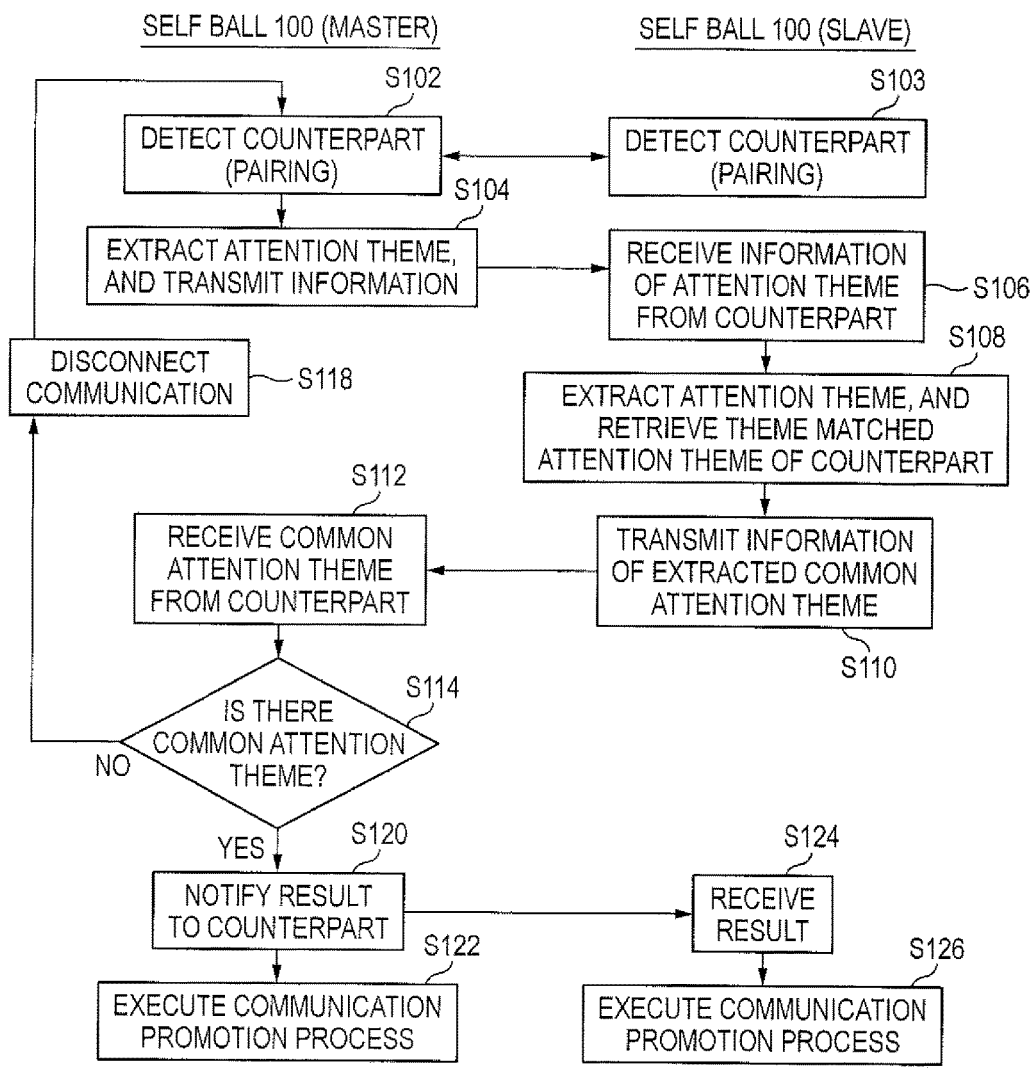
FIG. 14 is a diagram illustrating an exemplary process for a communication promotion executed by the self ball.

FIG. 14 illustrates a process flow of the communication promotion in the self balls 100 which approach each other. Before the users 80 carried with these self balls 100 enter the lounge 40, the users wander while looking around the display of the digital signage system 200 and the sight of the project in the project room 35, and various contents such as various articles. The interest levels with respect to the respect contents (and the keywords related thereto) are accumulated in the interest level storage unit 124.

In this instance, each self ball 100 periodically searches a counterpart which can communicate through a wireless communication protocol having a relatively small (for instance, several tens centimeters) communication range such as Class 3 of Bluetooth using the transmission/reception unit 102. When such a counterpart is detected, the self ball is paired with the counterpart through the protocol (S102 and S103). Herein, during a negotiation for the pairing, the counterpart is recognized whether it is the self ball 100, for instance, by exchanging the identification information indicating the self ball 100. Only in a case where the counterpart is the self ball 100, the pairing is performed. During the pairing, for instance, one of these two self balls 100 becomes the master device and the other one becomes the slave device at random. In addition, in S102 and S103, the respective self balls 100 may mutually detect the counterpart as the self ball "approaching" the user's self ball 100 in a case where it is confirmed that these two self balls 100 are mutually within a predetermined range by the distance measurement such as BLE.

The master device extracts a theme of which the interest level is set to be equal to or more than a predetermined setting (that is, the attention theme) from the interest level storage unit 124 of the master device by the attention theme determination unit 144. The extracted information of the attention theme is transmitted to the slave device through a communication path established by the pairing (S104, the proximity user information communication unit 146). The information of the transmitting attention theme may be only the IDs (for instance, the content IDs and the keywords) of the extracted attention themes, or may contain the value of the interest level of the master device user with respect to the respective attention themes.

The slave device receives the information of the attention theme from the master device (S106). The proximity user information communication unit 146 of the slave device extracts the attention theme of which the interest level is equal to or more than the threshold from the interest level storage unit 124 of the slave device by the attention theme determination unit 144. The extracted attention theme group and the attention theme group of the master device user received in S106 are compared to extract the common attention theme between the master device and the slave device (S108). In S108, all the common attention themes may be extracted between the master device and the slave device. Alternatively, the attention themes highly ranked in the interest level (for instance, a sum of the interest levels of the master device and the slave device) among the matched themes between the master device and the slave device may be extracted by a predetermined number (for instance, the most significant one).

The proximity user information communication unit 146 of the slave device transmits the information of the common attention theme extracted in S112 to the master device (S110). In a case where the common attention theme is not found between the master device and the slave device in S108, information indicating that there is no common attention theme is transmitted in S110.

The master device receives the information transmitted from the slave device in S110 (S112). The motivating operation instruction unit 148 of the master device determines whether the common attention theme between the master device and the slave device is contained in the information (S114). In a case where there is no common attention theme, the motivating operation instruction unit 148 instructs the transmission/reception unit 102 to disconnect the communication from the slave device (S118). Thereafter, the search for the counterpart's self ball 100 is periodically repeated by the transmission/reception unit 102. However, the slave device determined that there is no common attention theme in S114 may be not paired until a predetermined time elapses for instance. Therefore, during the pairing (S102 and S103), the identification information (for instance, the user ID) of the counterpart's self ball 100 is received. In a case where it is determined that there is no common attention theme in S114, the identification information may be registered in a list indicating that the pairing is forbidden for a certain time period.

In a case where it is confirmed that there is a common attention theme in S114, the motivating operation instruction unit 148 of the master device determines that the communication promoting operation is executed, and instructs the slave device to execute the communication promoting operation (S120). The ball driving control unit 126 is caused to execute the predetermined communication promoting operation (S122).

In a case where the motivating operation instruction unit 148 of the slave device receives an instruction to execute the communication promoting operation from the master device (S124), the ball driving control unit 126 is caused to execute the predetermined communication promoting operation (S126).

For instance, in a case where the master device and the slave device approach each other through the rotational movement as the communication promoting operation, the motivating operation instruction units 148 of the master device and the slave device execute a process of obtaining the direction of the counterpart's self ball 100 described above (the direction of the slave device obtained by the lounge system 400 is acquired, or the slave device is searched using the camera 106). The motivating operation instruction unit 148 instructs the ball driving control unit 126 such that the rotational movement is made at a predetermined speed in the obtained direction for instance. In addition, when a predetermined condition is satisfied in the instruction (for instance, there occurs a conflict with something or the movement distance reaches a predetermined distance), an instruction is issued to stop the rotational movement.

The communication promoting operation of approaching the master device and the slave device through the rotational movement can be made in a case where at least one of these devices is on the flat surface such as the table 45. However, the operation is not possible in a state where both are at hands of the respective users 80, for instance. Therefore, the master device and the slave device confirm that each is on the flat surface. In a case where the confirmation is made, the rotational movement may be performed. The confirmation on whether the device is on the flat surface can be achieved, for instance, by confirming that the user's self ball 100 is stopped by a signal of an built-in acceleration sensor, or by analyzing an image obtained by capturing the surrounding area of the user's self ball 100 using the camera 106 (capturing while rotating as needed). Therefore, it is possible to confirm whether the surrounding area of the user's self ball 100 is the flat surface. In addition, the lounge system 400 may determine whether the respective self balls 100 are on the table 45 from the image obtained by capturing the upper surface of the table 45, and notify the determination result to the self ball 100 corresponding to the respective self balls.

In a case where the information on the common attention theme is projected on the upper surface of the table 45 as the communication promoting operation, the communication promotion processing unit 140 causes the ball driving control unit 126 to control the posture of the self ball 100 such that the projecting direction of the projector 110 (a direction of a projection window provided in the outer skin of the self ball 100) faces in a predetermined direction. After an appropriate posture is adopted, projection information on the common attention theme is transferred onto the projection control unit 132, and projected from the projector 110.

After the master device and the slave device approach each other, the communication promoting operation may be performed such that at least one of the master device and the slave device projects the information on the common attention theme. In addition, other types of operations such as light emission, voice guidance, and vibration may be performed as the communication promoting operation.

It is determined whether the master device and the slave device are on the flat surface as described above. A situation where the master device and the slave device are placed is determined as the approaching operation through the rotational movement (or the projecting of an image of the attention theme) in a case where the devices are on the flat surface and, if not, as the operation of vibration or voice guidance. The type of the communication promoting operation may be selected according to the determination result.

In the instance illustrated in FIG. 14, in a case where there is a common attention theme, the communication promoting operation has been executed on both the master device and the slave device, but instead only one of the master device and the slave device may execute the communication promoting operation. In addition, in the instance of FIG. 14, in a case where the slave device finds out the common attention theme in S108, the slave device notifies the common attention theme to the master device (S110), and executes the communication promoting operation (S126) according to the instruction from the master device (S124). However, such a process flow is given as merely exemplary. For instance, when finding out the common attention theme in S108, the slave device may execute the communication promoting operation, and instruct the master device to execute the communication promoting operation. The common attention theme between the master device and the slave device may be retrieved through information exchange therebetween. In a case where the common attention theme is found out, one (or both) serving the communication promoting operation between the master device and the slave device may perform a predetermined communication promoting operation. These configurations are also the same in the following instances illustrated in FIGS. 15 to 18.

Next, another exemplary process for the communication promotion will be described with reference to FIG. 15.

Figure 15:
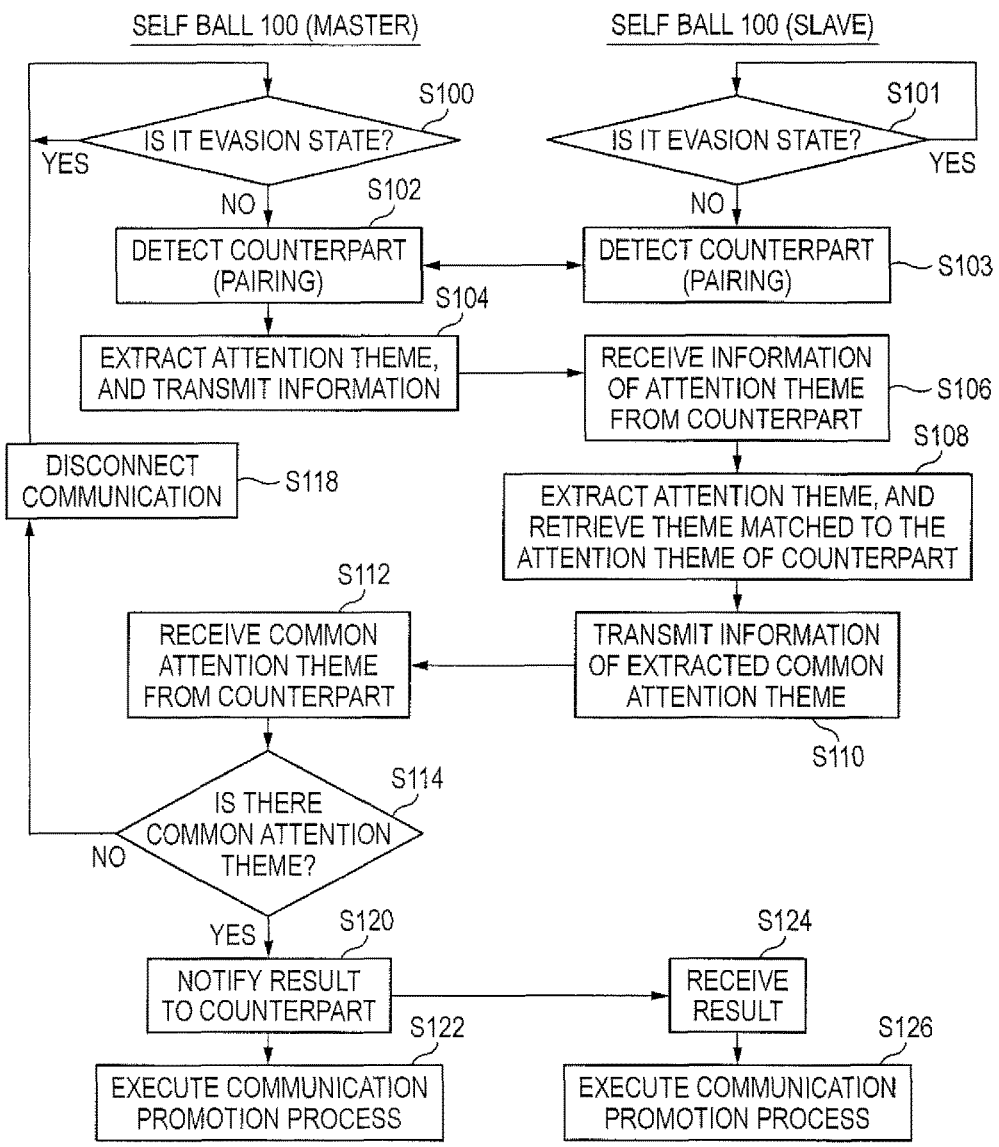
FIG. 15 is a diagram illustrating another exemplary process for the communication promotion executed by the self ball.

In the process of FIG. 15, the process is changed according to the determination result of the communication evasion state of the user performed by the user state determination unit 142 (and the lounge system 400).

In the instance of FIG. 15, the user state determination unit 142 of the self ball 100 periodically determines whether the user 80 is in the communication evasion state based on the determination result obtained from the user state determination unit 408 of the lounge system 400 and the information obtained from the sensor of the user's self ball 100 such as the camera 106 (S100 and S101). In a case where it is determined that the user 80 is in the communication evasion state, the procedure does not proceed to S102 or S103 to search for the counterpart's approaching self ball 100, and rejects the communication connection even when a request for the connection from the other self balls 100 is received. Therefore, in a case where it is determined that the user 80 corresponding to the self ball 100 does not want to communicate with other users from the expression and the behavior, the communication promoting operation by the self ball 100 is not performed even when the other users standing near pay attention to the same theme.

On the other hand, in a case where the determination result of S100 or S101 is not the communication evasion state (so to speak, a state where "the user does not mind talking to anybody"), the procedure proceeds to S102 or S103, and the search for an approaching counterpart's self ball 100 is executed. In a case where both the users 80 of two approaching self balls 100 in the lounge 40 are not in the communication evasion state, the pairings of S102 and S103 are established. Thereafter, the same process as that illustrated in FIG. 14 is performed.

In the instance of FIG. 15, when the user 80 is in a state of unwilling to talk, the communication promoting operation is less likely to be performed.

Next, still another exemplary process for the communication promotion will be described with reference to FIG. 16.

Figure 16:
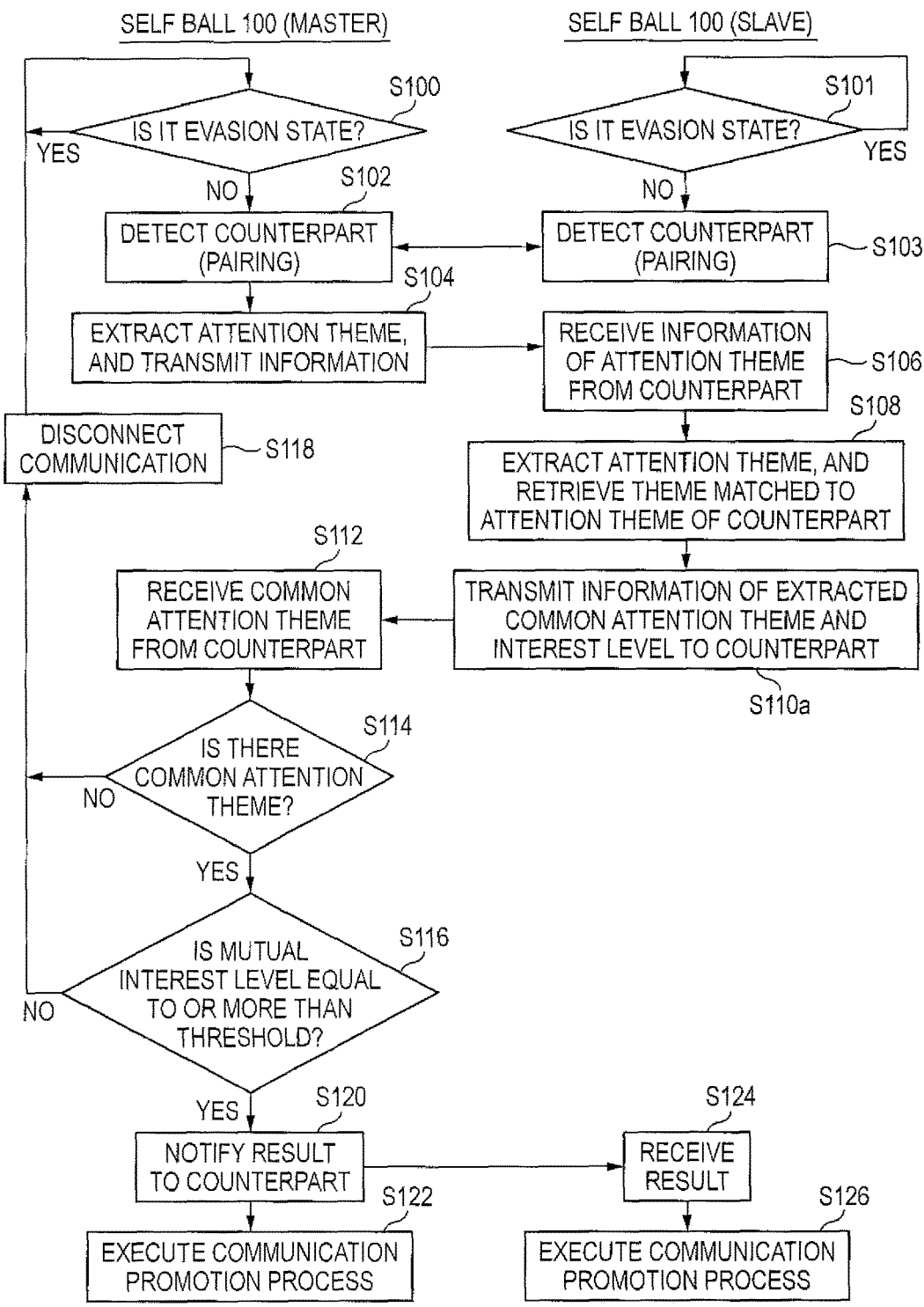
FIG. 16 is a diagram illustrating still another exemplary process for the communication promotion executed by the self ball.

In the instance of FIG. 16, in addition to the instance of FIG. 15, the interest level of the proximity users to each other is further taken into consideration. In this instance, the user state determination unit 142 of each self ball 100 periodically calculates the interest level of the user 80 of the user's self ball 100 with respect to the other users 80 standing near through the above-described method using the user state determination unit 408 of the lounge system 400.

The procedure from S100 to S108 of FIG. 16 is the same as that of the instance of FIG. 15. After S108, the slave device transmits the interest level of the user of the slave device obtained by the user state determination unit 142 with respect to the user of the master device, and the information of the communication attention theme extracted in S108 toward the master device (S110a).

The master device receives the information (S112), determines whether there is a common attention theme between the master device and the slave device (S114), and determines whether the interest level of the user of the master device with respect to the user of the slave device and the interest level of the user of the slave device with respect to the user of the master device are both equal to or more than the threshold (S116). Only in a case where the determination results of both S114 and S116 are positive, the communication promoting operation is performed (S120 to S126). In a case where it is determined in S116 that the interest of one user with respect to the counterpart user is low (equal to or less than the threshold) even though it is determined that there is a common attention theme in S114, the procedure does not proceed to the communication promoting operation, and the communication with the counterpart's self ball 100 is disconnected (S118).

In the instance of FIG. 16, the communication promotion is hardly performed on the counterpart having a low interest.

Figure 17:
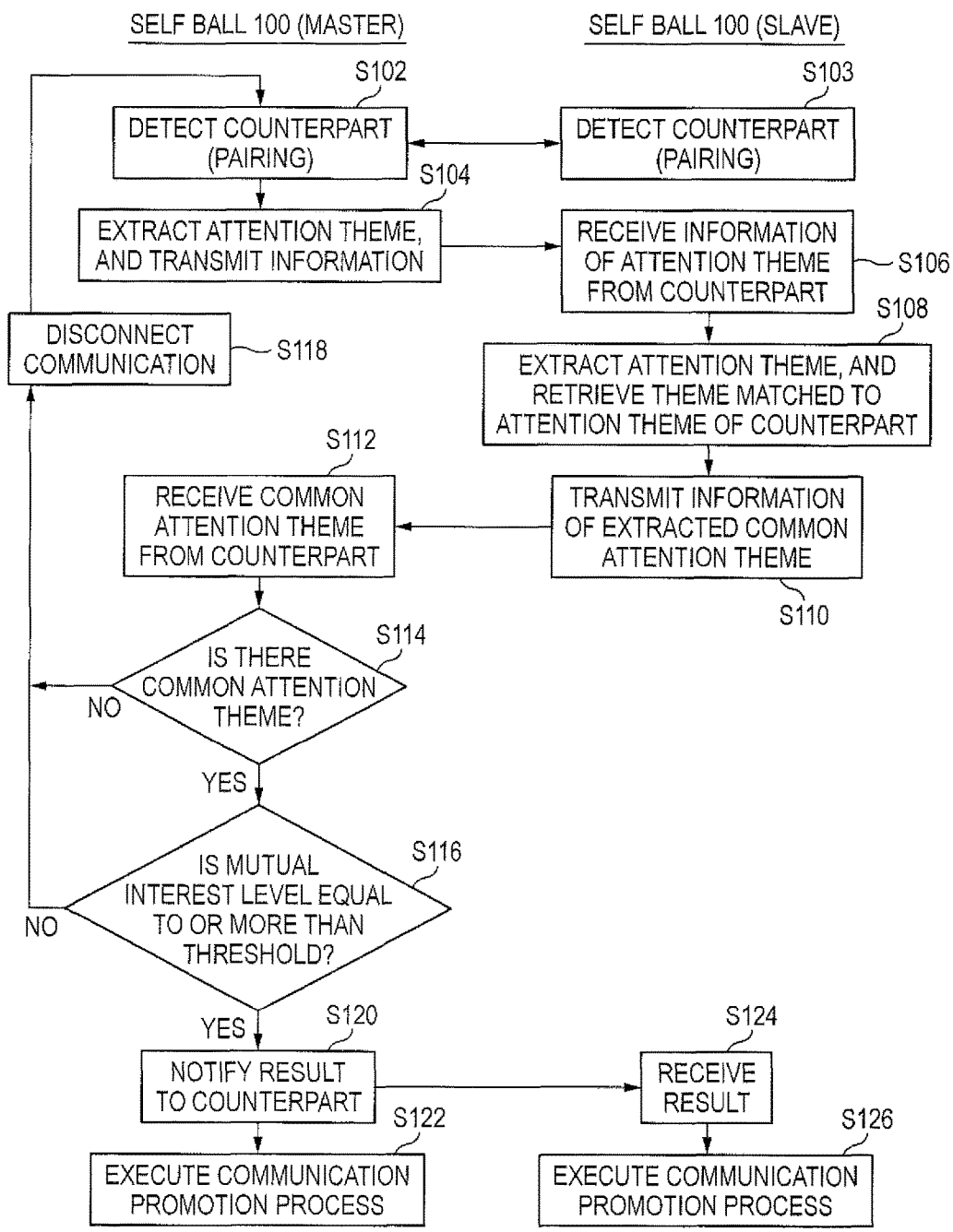
FIG. 17 is a diagram illustrating still another exemplary process for the communication promotion executed by the self ball.

In still another processing procedure illustrated in FIG. 17, the control (S100 and S101) of the process based on the determination on the communication evasion state is eliminated from the instance of FIG. 16.

Figure 18:
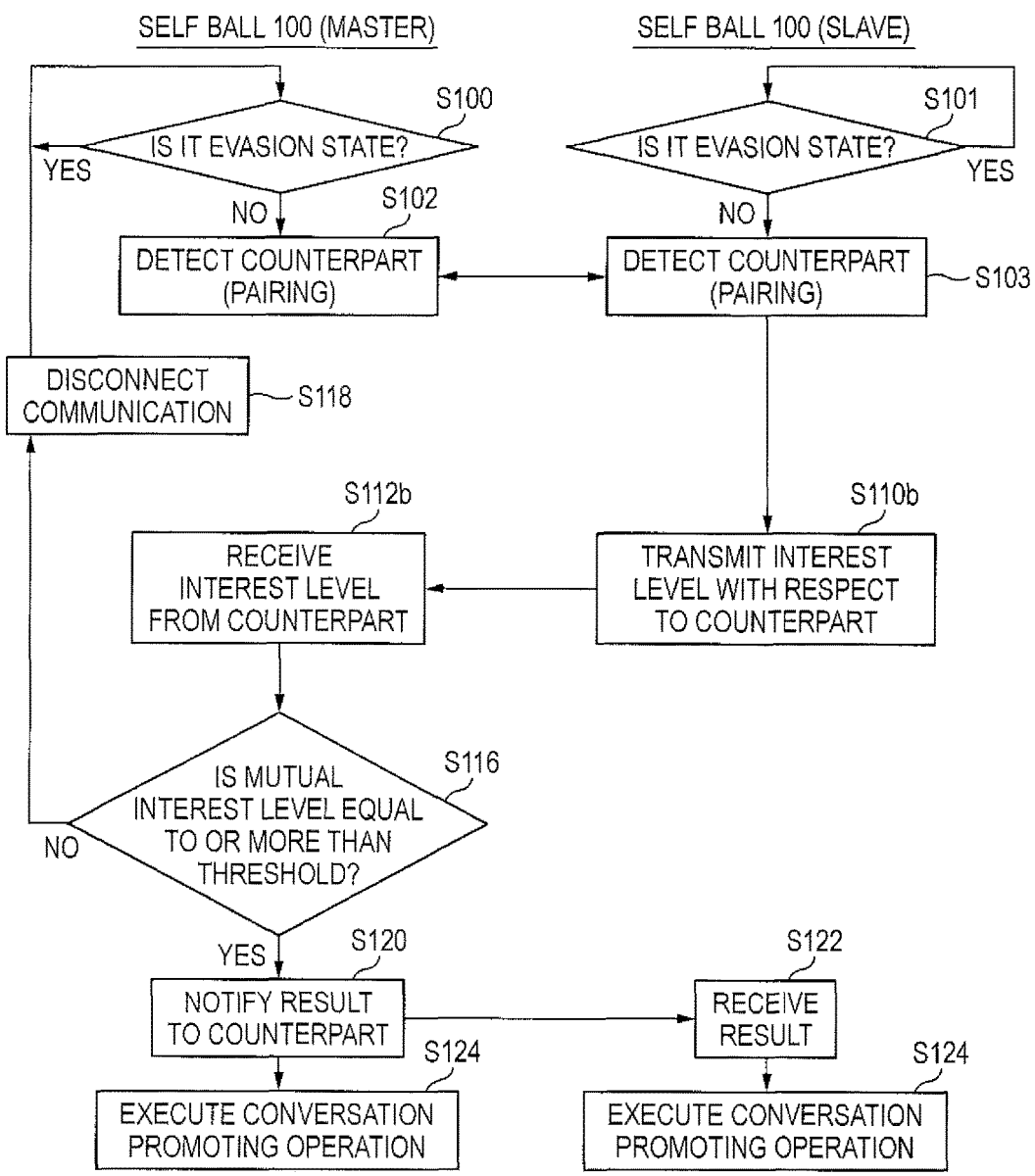
FIG. 18 is a diagram illustrating still another exemplary process for the communication promotion executed by the self ball.

In still another processing procedure illustrated in FIG. 18, the communication promoting operation is controlled whether it is performed only based on the interest level with respect to the counterpart user standing near without using the interest level with respect to the content of the digital signage system 200 and the project in the project room 35.

The procedure from S100 to S103 of FIG. 18 is the same as that of FIG. 15. After the pairing in S103, the slave device transmits the information of the interest level of the slave device obtained by the user state determination unit 142 of the own device with respect to the user of the master device (S110b). The master device receives the interest level information, and it is determined whether the interest level of the user of the master device obtained by the user state determination unit 142 of the own device with respect to the user of the slave device and the interest level received in S110b are both equal to or more than the threshold (S116). In a case where the determination result of S116 is negative, the communication between the master device and the slave device is disconnected (S118). In a case where the determination result of S116 is positive, the communication promoting operation is executed (S120 to S126).

As described above, in the system, the communication promotion between the user and the counterpart user is controlled using one of three indexes ((1) the interest levels of the user with respect to the respective themes, (2) the state of the user (whether the communication evasion state or not), and (3) the interest level of the user with respect to the counterpart user standing near).

Second Example of Entire Configuration of System

In the first example of the system configuration which is described above, the control unit 120 in the self ball 100 has determined whether the self ball 100 performs the communication promoting operation. With this regard, an advanced process such as the determination function on the communication promoting operation may be performed in an external server of the self ball 100 as another system configuration. In this case, the self ball 100 may be provided with a sensor such as a camera and an output unit (the driving mechanism for the rotational movement) for the communication promoting operation. The determination on whether the communication promoting operation is performed and the content of the operation is based on the determination of the external server.

Figure 19:
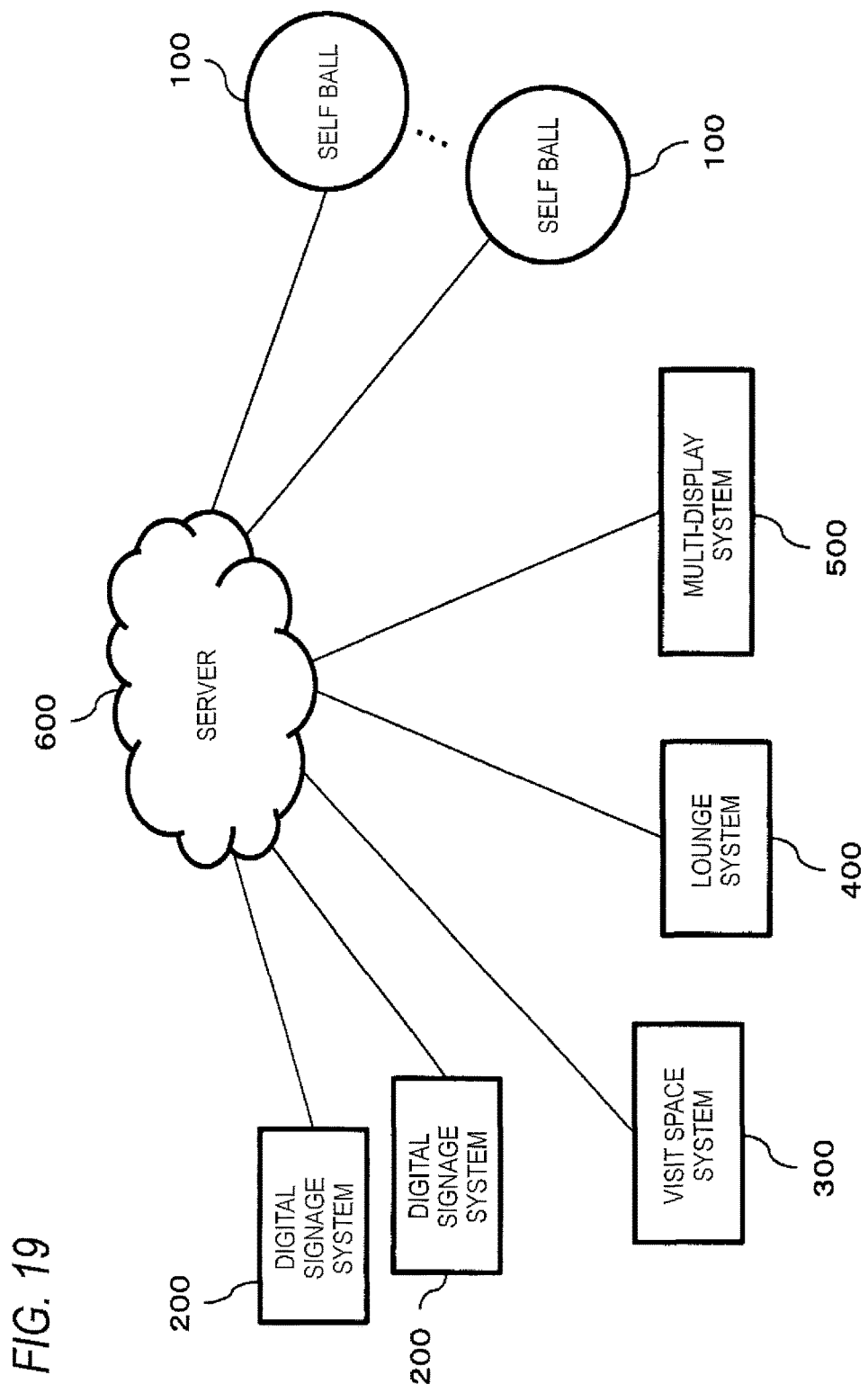
FIG. 19 is a diagram illustrating an instance of the entire system configuration of the second example.

FIG. 19 illustrates an instance of the system configuration. The system in this instance includes the server 600 which has charge of the advanced process such as the determination on the communication promoting operation. The server 600 communicates with the digital signage system 200, the visit space system 300, the lounge system 400, the multi-display system 500, and the self balls 100 of the respective users 80 through a wired or wireless LAN or a wireless communication connection such as Bluetooth. The system is installed in the shared work space 10 similarly to the case of the first exemplary embodiment.

Figure 20:
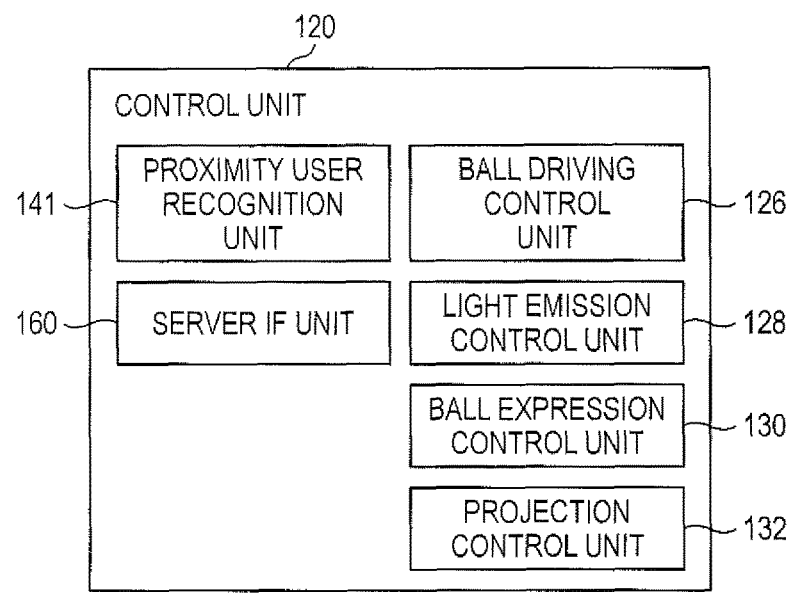
FIG. 20 is a diagram illustrating an exemplary functional configuration of the control unit of the self ball of the second example.

The configuration of the self ball 100 in this example may be similar to that of the first example illustrated in FIG. 7. However, the function of the control unit 120 is different from that of the control unit 120 of the first example. FIG. 20 illustrates an exemplary functional configuration of the control unit 120 of the self ball 100 of the second example.

There is provided the ball driving control unit 126, the light emission control unit 128, the ball expression control unit 130, the projection control unit 132, the proximity user recognition unit 141, and a server IF (interface) unit 160.

Among them, the functions of the ball driving control unit 126, the light emission control unit 128, the ball expression control unit 130, and the projection control unit 132 are the same as those of the elements denoted with the same names and symbols in the control unit 120 of the first example illustrated in FIG. 8. However, while these respective elements in the first example executes the processes according to the instruction of the motivating operation instruction unit 148 in the control unit 120, the processes in this example are executed according to the instruction assigned from the server 600 through the server IF unit 160.

Similarly to the first example, the proximity user recognition unit 141 uses a wireless device having a relatively narrow communication range in the transmission/reception unit 102 to search the other self ball 100 which can communicate. The proximity user recognition unit 141 recognizes the user ID of the found self ball 100. Alternatively, in a case where a distance to the counterpart's self ball 100 measured by BLE falls within a predetermined threshold, the proximity user recognition unit 141 may recognize the user ID of the counterpart's self ball 100 as the "proximity user". In an example where the distances between the self balls 100 are obtained from the positions of the respective self balls 100 captured by the camera 404 of the lounge system 400 and the pairing of the proximity users is determined, there is no need to install the proximity user recognition unit 141 and a specific wireless device for searching the proximity user in the self ball 100.

The server IF unit 160 is a functional module which exchanges data and commands with respect to the server 600. For instance, the server IF unit 160 transmits a signal and data generated by the sensor such as the camera 106 and the recognition result of the proximity user recognition unit 141 (for instance, the user ID acquired from the other self ball 100 proximity to the user's self ball 100, and the user ID of the user's self ball) to the server 600. In addition, the server IF unit 160 receives an instruction of the communication promoting operation and the auxiliary data of the instruction from the server 600. The server IF unit 160 controls one or more units among the ball driving control unit 126, the light emission control unit 128, the ball expression control unit 130, and the projection control unit 132 according to the instruction. Therefore, the communication promoting operation by the self ball 100 is realized.

The functional configurations of the digital signage system 200, the visit space system 300, the lounge system 400, and the multi-display system 500 may be the same as those of the system denoted with the same names and symbols in the first example described with reference to FIGS. 11 to 13. While the system in the first example notifies the information of the obtained interest level and the user state (the communication evasion state) to the self ball 100, the system in the second example notifies the information to the server 600 (the interest level notification units 216 and 312 and the user state notification unit 410 of FIGS. 11 to 12). Similarly to the self ball 100, the advanced information processing functions (for instance, the interest level determination units 214 and 310, the user state determination unit 408, and the display control unit 512) of the digital signage system 200, the visit space system 300, the lounge system 400, and the multi-display system 500 are installed in the server 600. Then, the system 200 may have only functions performed in a physical layer such as a control of the hardware (the display device 204).

Figure 21:
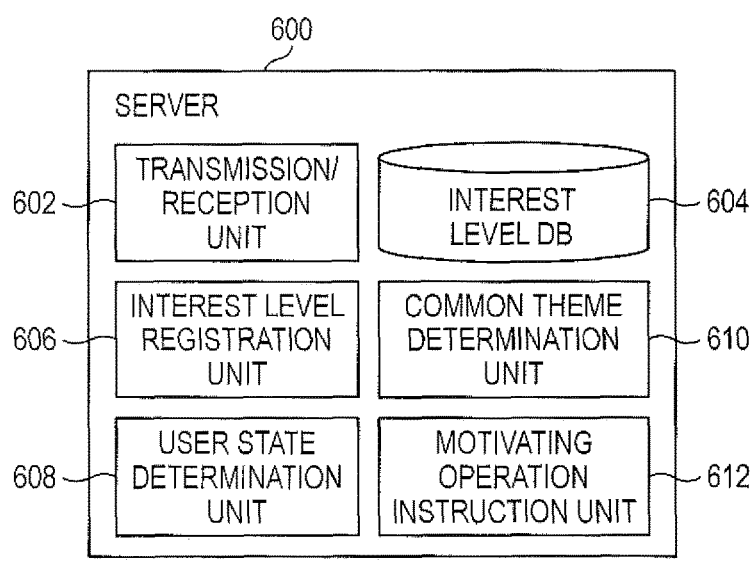
FIG. 21 is a diagram illustrating an exemplary functional configuration of a server of the second example.

The server 600 includes, for instance, a transmission/reception unit 602, an interest level DB (database) 604, an interest level registration unit 606, a user state determination unit 608, a common theme determination unit 610, and a motivating operation instruction unit 612 as illustrated in FIG. 21.

The transmission/reception unit 602 transmits and receives information with respect to the self ball 100, the digital signage system 200, the visit space system 300, the lounge system 400, and the multi-display system 500 of each user 80 through a LAN.

The interest level DB 604 is a database which manages the interest level information on the respective themes of the respective users 80. The information stored in the interest level DB 604 may be the same as the collected information which is stored by the self ball 100 in the interest level storage unit 124 in the first example. FIG. 22 illustrates an instance of the data content of the interest level DB 604. In this instance, the information (the content itself or the content ID) of the content found by the user and the interest level of the user 80 with respect to the content are registered in the interest level DB 604 in association with the user ID of each user. In this instance, the information of the interest level of the user 80 with respect to the keyword associated to the content is also registered in the interest level DB 604.

The interest level registration unit 606 receives the information of the interest level of the user 80 with respect to the content (for instance, the user TD, the content ID, and the value of the interest level) which is sent from the digital signage system 200, the visit space system 300, and the lounge system 400, and registers the information in the interest level DB 604. The interest level with respect to each related keyword is calculated from the received interest level with respect to the content, and registered in the interest level DB 604.

The user state determination unit 608 determines, for instance, whether the user 80 is in the communication evasion state based on the determination result (if needed, detection data obtained by the sensor of the self ball 100 and the wearable device of the user 80) of the user state determination unit 408 of the lounge system 400.

The common theme determination unit 610 determines the common attention theme between the users 80 approaching each other in the lounge 40 from the information stored in the interest level DB 604 (the content and the keyword of which the interest level is equal to or more than a threshold).

The motivating operation instruction unit 612 instructs the self balls 100 of the users 80 approaching each other to execute the communication promoting operation according to the determination result of the user state determination unit 608 and the common theme determination unit 610. The instruction includes the information required for executing the communication promoting operation (for instance, the information of the movement direction of the self ball 100, or the captured image data).

An exemplary procedure of the communication promotion in the second example will be described with reference to FIG. 23.

Figure 23:
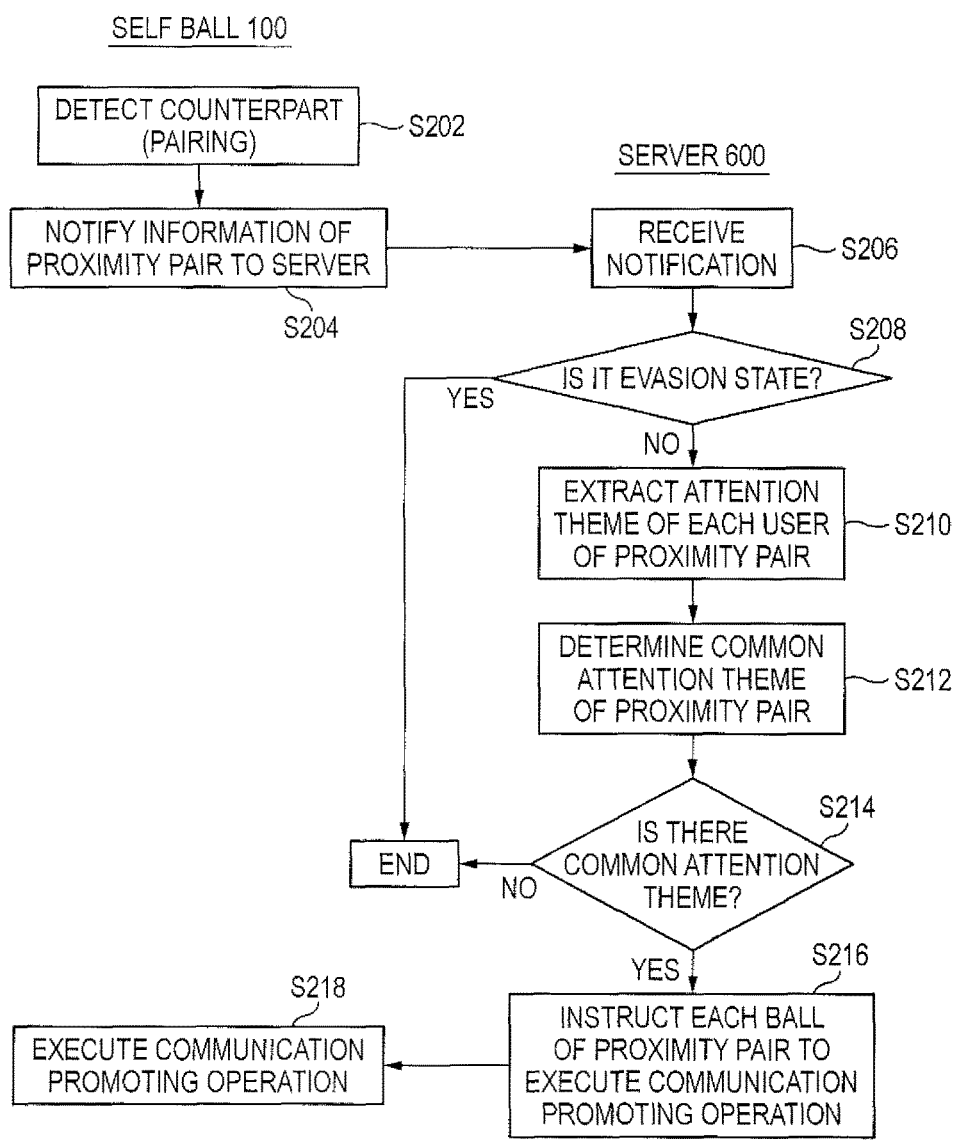
FIG. 23 is a diagram illustrating an exemplary procedure of the communication promotion in the second example.

FIG. 23 illustrates a process flow performed by the server 600 and one of the self balls 100 approaching each other. Since the process of the other self ball 100 is the same as that of the self ball 100 in the drawing (or only a part of the process may be executed), the details are omitted in the drawing. Before the users 80 carried with these self balls 100 enter the lounge 40, the users 80 look around the display of the digital signage system 200, the sight of the project in the project room 35, and various contents such as various articles. The interest levels of each user with respect to these contents (and the related keywords) are accumulated in the interest level DB 604.

The respective self balls 100 periodically search a counterpart which can communicate through a wireless communication protocol such as Bluetooth Class 3 similarly to the first example using the transmission/reception unit 102 and the proximity user recognition unit 141. When such a counterpart is detected, the self ball 100 is paired with the counterpart through the protocol (S202). At this time, the proximity user recognition unit 141 acquires the user ID from the paired counterpart's self ball 100. The server IF unit 160 sends an approach detection notification to the server 600 including the user ID of the user's self ball 100 and the acquired user ID of the counterpart's self ball 100 (S204). The user's self ball 100 and the counterpart's self ball 100 detected in S202 will be called an approach pair. The transmission of the approach detection notification of S204 may be performed by both the self balls 100 of the approach pair, or may be performed only by any one of them (for instance, the self ball serving as the master device).

The server 600 receives the approach detection notification (S206). It is determined whether the users corresponding to two user IDs contained in the notification each are in the communication evasion state (S208). The determination may be performed by the user state determination units 408 and 608 based on the expressions and behaviors of the respective users captured by the camera 404 of the lounge system 400 at that time through the same method as that described in the first example. In a case where any one of the two users of the approach pair is in the communication evasion state (the determination result of S208 is Y), the process is ended. In this case, the communication promoting operation is not performed. In a case where the two users 80 both are not in the communication evasion state (the determination result of S208 is N), the server 600 (the communication theme determination unit 610) specifies a theme (the attention theme) of which the interest level of the user is equal to or more than a threshold from the interest level DB 604 (S210). Then, the communication attention theme between these two users is obtained (S212). It is determined whether the common attention theme is obtained (S214). In a case where the common attention theme is obtained, the process is ended. In a case where there is the common attention theme, the server 600 (the motivating operation instruction unit 612) instructs the self balls 100 of the respective users in the approach pair to execute the same communication promoting operation as that described in the first example (S216). In the instruction, the motivating operation instruction unit 612 specifies the positions of the respective self balls 100 in the approach pair from the image captured by the camera 404 of the lounge system 400 for instance so as to obtain the movement directions of the respective self balls 100. The motivating operation instruction unit 612 instructs the corresponding self balls 100 with the movement directions. The information on the common attention theme may be instructed to be projected as the communication promoting operation.

The communication promoting operation is executed such that the self balls 100 approaching each other receive the instruction of the communication promoting operation from the server 600 and controls the respective units according to the instruction (S218).

The role sharing between the self ball 100 and the server 600 in the second example described above is given as merely exemplary. For instance, the description in the second example has been made about that the detection of the self balls 100 approaching each other is performed by the self balls 100. However, it may be considered an extreme configuration of the system in which even this function is installed in the server 600 (for instance, the detection is made from the image captured by the camera 404 of the lounge system 400). In the configuration, the self ball 100 has charge only of specifying and presenting the user ID and of executing the communication promoting operation. Between such an extreme configuration of the system and an extreme configuration (the first example) in which a lot of processes are charged onto the self ball 100 without providing the server 600, there may be various system configurations different in role sharing between the self ball 100 and the server 600.

Exemplary Embodiment of Multi-Display

Next, an exemplary embodiment related to the display of the multi-display system 500 will be described.

As described above, the multi-display system 500 acquires the information of the interest level of the user in front of the multi-display from the self ball 100 of the user or the server 600 through the interest information acquisition unit 508. Then, the display control unit 512 controls whether information (information on the content and the keyword) on a theme is displayed in the multi-display according to the information of the interest level. Herein, the theme and the display manner of the multi-display are determined, for instance, by at least a predetermined one of the following criteria (a) to (f).

(a) A theme having a high interest level of the user in front of the multi-display is highlighted. For instance, the information on a theme to which the user has the interest level equal to or more than a predetermined threshold is highlighted. In addition, the highlighting may be intensified as the interest level is increased. The highlighting may be performed by enlarging a display area for the information of the theme for instance. The display area is enlarged by increasing the number of display devices for displaying one theme by 2×2 or 3×3 for instance. A degree of the highlighting is expressed by a size of the display area. The highlighting by expanding the display area is given as merely exemplary. In addition, the highlighting may be made such that the display information is easily noticeable as the interest level of the theme is increased by emphasizing brightness or contrast of the display screen.

Figure 24:
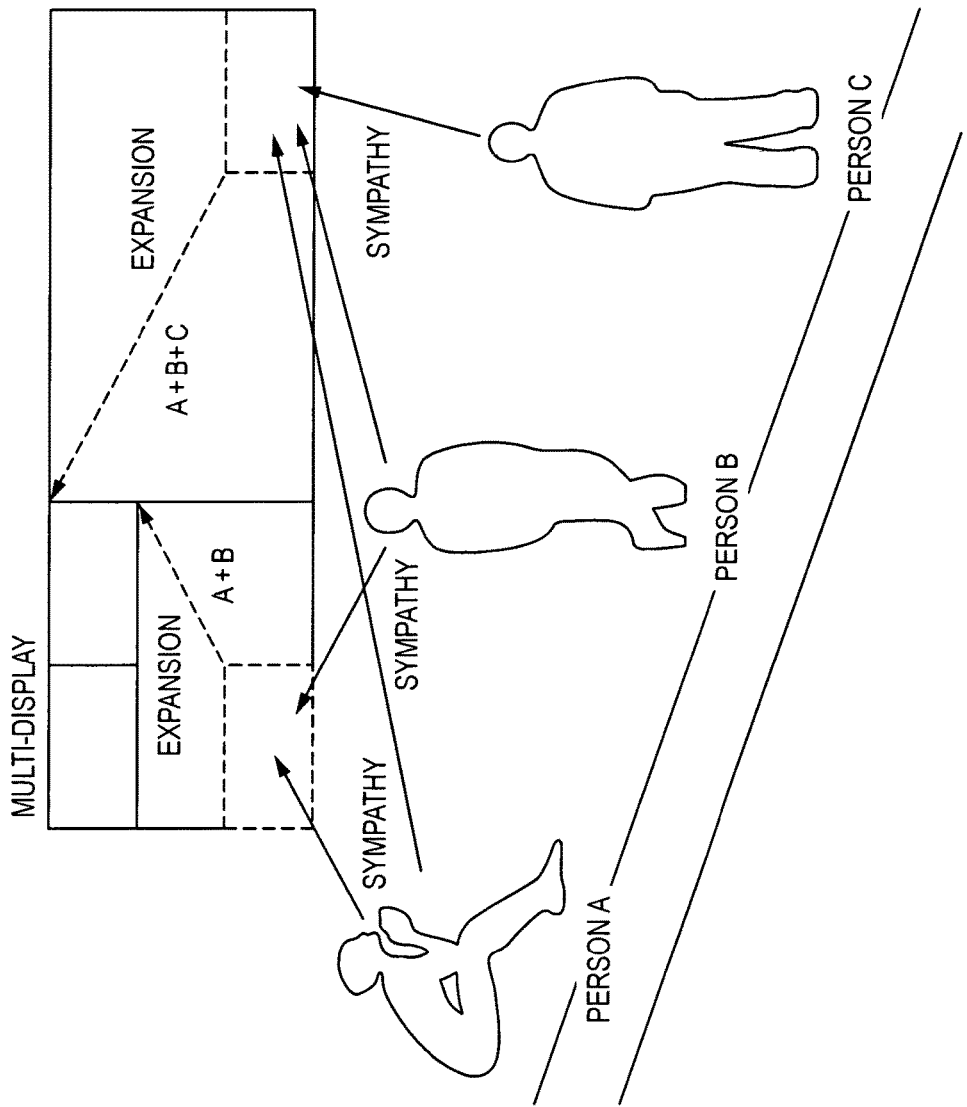
FIG. 24 is a diagram illustrating an instance in which a size of a content displayed in a multi-display is controlled according to the number of users interested in the content.

(b) In a case where there are plural users in front of the multi-display, the theme to which a lot of users have a high interest level (for instance, an interest level equal to or more than a predetermined threshold) among the plural users. For instance, in the instance illustrated in FIG. 24, the content of which the interest level of two users A and B in front of the multi-display is equal to or more than the threshold is displayed in a screen (expanded twice) containing 2×2 display devices. The content of which the interest level of three uses A, B, and C is equal to or more than the threshold is displayed in a screen (expanded three times) containing 3×3 display devices.

(c) In a case where there are plural users in front of the multi-display, a theme having an evaluation value (for instance, a total sum of the interest levels of the plural users) obtained by summing the interest levels of the plural users is displayed in an intensively highlighting manner.

(d) In a case where a provider (for instance, a representative or a staff who introduces the content) of the content is in the shared work space 10, the content having a high interest level (for instance, a level equal to or more than the threshold) of the user in front of the multi-display is highlighted. A type of the highlighting display in this case may be different from the highlighting display in the case of (a) to (c). Whether the provider of the content is in the shared work space 10 may be determined by inquiring of the server which manages the information about whether the respective users are in the shared work space 10.

(e) The information on the theme having a high interest level of the user in front of the multi-display is displayed at a position on the multi-display near the user. For instance, as the information on the theme having the interest level of the user is increased, the information is displayed at a position near the user.

(f) The information on the theme to which the plural users in front of the multi-display commonly have a high interest level (for instance, a value equal to or more than a predetermined threshold) is displayed at a position where the plural users can easy to view the information (for instance, the middle position of the plural users).

Figure 25:
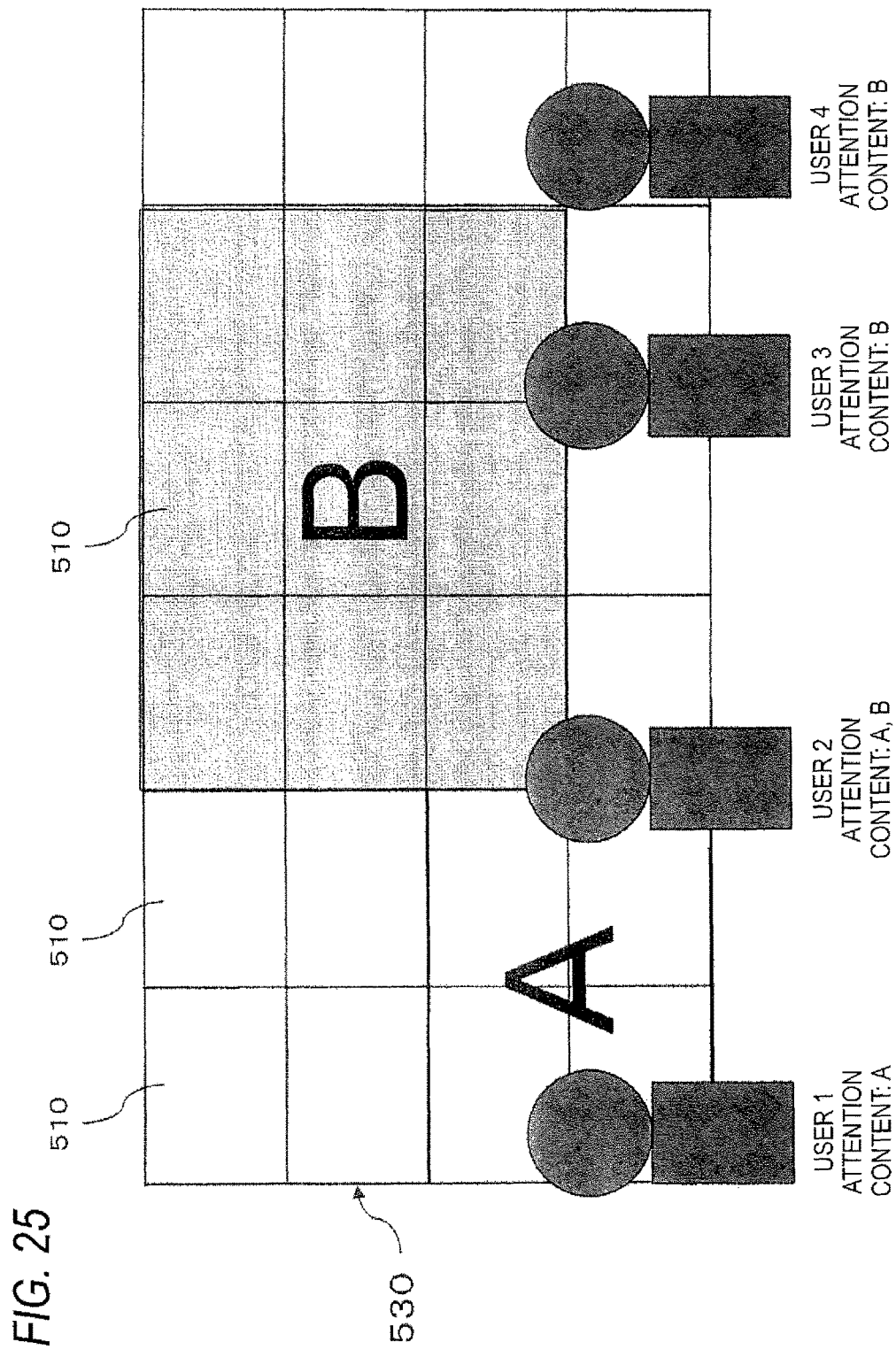
FIG. 25 is a diagram illustrating an instance in which a position of a content displayed in the multi-display is controlled according to the number and the positions of users strongly interested in the content.

An instance in a case where a display layout of the multi-display is controlled according to the above criteria (b) and (f) is illustrated in FIG. 25. A multi-display 530 in this instance is configured with 4×6 display devices 510, and four users are in front thereof. Content A receives attention from two Users 1 and 2 (that is, the interest level is equal to or more than a certain threshold), and Content B receives attention from three Users 2, 3 and 4. In this case, Content A is displayed almost at the center position between Users 1 and 2 (for instance, a screen configured with 2×2 display devices 510). Content B is displayed almost at the center position between Users 2, 3, and 4 (for instance, a screen configured with 3×3 display devices 510).

Figure 26:
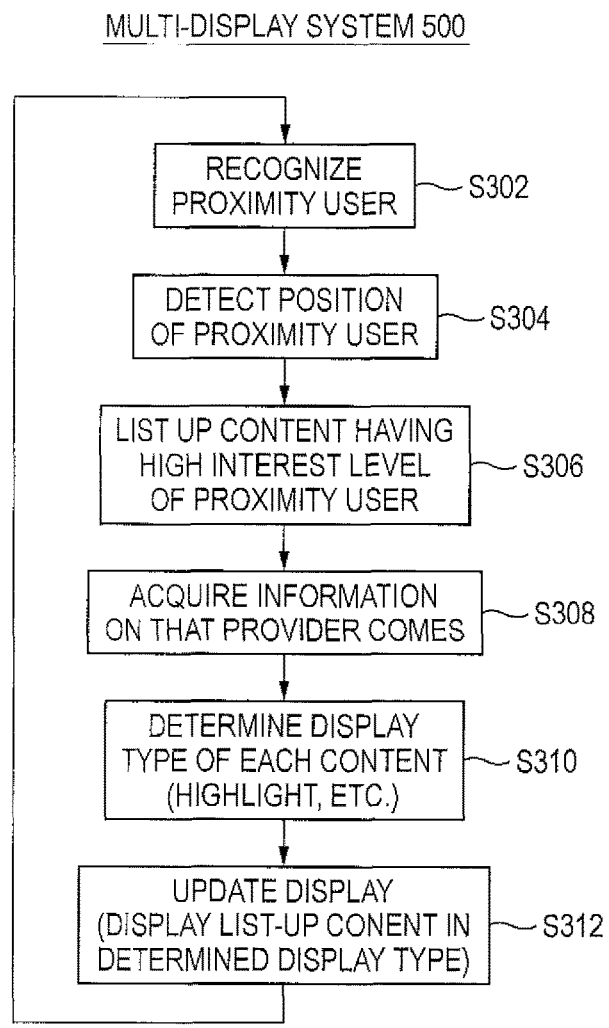
FIG. 26 is a diagram illustrating an exemplary process in which a content displayed in the multi-display is controlled according to an interest level of one or more users in front of the multi-display.

FIG. 26 illustrates an instance of the processing procedure of the multi-display system 500 in this exemplary embodiment.

The procedure is executed at every predetermined time, for instance.

In this procedure, first, the ID recognition unit 506 recognizes the user ID of the user near in front of the multi-display 530 by the recognition of the user ID through the wireless communication or the face recognition from the image captured by the camera 504 (S302). Next, relative positions (in particular, the positions of the users in the horizontal direction of the multi-display 530) of the respective users with respect to the multi-display 530 are determined by the user position determination unit 514 (S304). The determination on the position may be performed by the above-mentioned method for identifying the respective users from the image captured by the camera 504 for instance. The interest information acquisition unit 508 acquires the information of the interest levels of the respective users from the self balls 100 or the server 600. The display control unit 512 obtains the interest levels with respect to the respective themes from the information acquired by the interest information acquisition unit 508, and sorts the interest levels of these themes in a descending order of the interest level (S306). Herein, in a case where the plural users are detected in front of the multi-display 530, the interest level for each theme is obtained by summing (for instance, a total sum) the interest levels of the plural users for each theme.

The multi-display system 500 inquires of the server which manages the provider about whether the provider of the content among the themes having a highly ranked interest level is in the shared work space 10 (S308).

The display control unit 512 determines a display type of each theme having a high ranked interest level in the sorting result in S306 according to one or more predetermined criteria among (a) to (f) described above (S310). Herein, the determined display type of each theme (in other words, a display layout of the multi-display 530) includes one or more types among a display area and a display position (a portion in the multi-display 530) for each theme, and a contrast and a brightness of an image.

Then, the display control unit 512 displays the information of each theme having a high ranked interest level in the display type determined in S310 (S312). Therefore, the display of the multi-display 530 is updated.

In this exemplary embodiment, the highlighting display of a specific type (for instance, highlighting by expanding the display area) may be limited to display the information of the theme to which the plural users commonly have a high interest level.

In a case where the highlighting display is performed, the self ball 100 of the user having a high interest level (for instance, a level equal to or more than the threshold) with respect to the theme (a highlighting display target) is notified from the multi-display system 500. When receiving the notification, the self ball 100 calls attention of the user carried with the self ball 100 through vibrations or light emission for instance. The notification and the operation such as the vibrations of the self ball 100 may be limited to a case where a specific type of highlighting display is performed with respect to the theme to which the plural users commonly have a high interest level. In this case, the user who recognizes the notification through the operation of the self ball 100 comes to know that there are other users having the common interest with the user in front of the multi-display 530.

In a case where the content is displayed on the multi-display 530, the multi-display system 500 may perform notification to the provider of the content. The notification is made to, for instance, the self ball 100 carried by the provider through the wireless LAN. The self ball 100 received the notification performs a predetermined specific operation (for instance, vibrations in a specific pattern). Alternatively, the notification may be made using other communication unit such as an electronic mail. The information of the provider of the content may be acquired from a database which stores auxiliary meta data of the content and the information of the content. The provider of the content comes to know that there is a user interested in the content related to the provider is in front of the multi-display 530 through the notification. For instance, the provider may go to the multi-display 530 to have a talk to the user. The notification may be limited to a case where the content is highlighted.

It has been searched a person who is in the space at that time among the providers of the respective contents in S308 and, if so, the corresponding content is highlighted in S310 and S312 in the procedure of FIG. 26, but the configuration has been given as mere instance. Not only in a case where the provider is in the space, but also in a case where the provider of the content is scheduled to visit the space within a predetermined time from the time point or to come to the space at that day, the content may be highlighted in the multi-display 530.

In this exemplary embodiment, the information (content and keyword) of the theme having a high interest level of the user in front of the multi-display 530 is displayed noticeably. In a case where there is a theme in which the plural users in front of the multi-display 530 are highly interested in common (theme sympathized by the user), the theme is subjected to a specific highlighting to motivate a communication between the users.

Herein, the description has been made about an instance in which the plural display devices 510 are displayed in the multi-display 530 disposed in a lattice shape. However, in place of the multi-display 530, a single large-scaled display device may be installed and divided into small screens to display plural images.

Other Example (1) In the above instance, the self ball 100 carried by the user stores the user ID of the user, an information processing system such as the digital signage system 200 in the shared work space 10 recognizes the user TD of the self ball 100 so as to identify the user. However, such a configuration has been given as merely instance. Instead, for instance, the digital signage system 200 identifies the user by a face recognition technology from an image captured by the camera 212 equipped therein, so that the user ID of the user 80 in front of the display device 204 may be specified. Such a configuration may be equally applied to the visit space system 300, the lounge system 400, and the multi-display system 500.

(2) In the above-described instance, the interest level of the user 80 with respect to the content has been calculated mainly based on the reaction (gazing, touching, and questioning in voice) to the content presented in the shared work space 10, and the communication promoting operation has been executed between the users commonly having a high interest level with respect the same theme. Besides, in a case where there are a user 80 who has a high interest level equal to or more than a threshold with respect to a certain content and the provider (for instance, a representative or a staff who introduces the content) of the content are present in the same place (the lounge 40), the communication promoting operation may be executed between these two persons.

As an instance, with the user 80 corresponding to the provider of the content, the value of the interest level of the subject user 80 with respect to the content which is stored in the interest level storage unit 124 of the self ball 100 or in the interest level DB 604 of the server 600 may be set to a predetermined high value (a maximum value). In another instance, in S104 and S108 of the procedure of FIG. 14 and S210 of FIG. 23, the user 80 automatically selects the content of the provider as an attention content when the attention theme of the user 80 carried with the self ball 100 is obtained. In this way, when the provider of the content and the user having a high interest level with respect to the content are present near with the self ball 100, the communication promoting operation by the self balls 100 is executed between these two persons by the processes of the first and second examples of the system configuration. Herein, for instance, the self ball 100, the digital signage system 200, the visit space system 300, the lounge system 400, or the multi-display system 500 may search the content itself or the information (the user ID) of the provider of the content registered in the accessible database to determine whether the user 80 carried with the self ball 100 is the provider of the content.

(3) The communication to the provider of the content may be promoted through a communication unit by touching the content displayed in the digital signage system 200. As the communication unit, various tools such as an electronic mail, a chat, and a television phone may be used.

(4) In a case where it is detected that the provider of the content enters a specific place (for instance, the lounge 40) in the shared work space 10 where the conversation can be freely made, the notification may be made to the self ball 100 of the user having a high interest level (for instance, a level equal to or more than the threshold) with respect to the content. The detection may be made using a sensor (the camera and the ID recognition unit) installed in a specific place such as the lounge system 400. In addition, the notification may be made by a device such as the server 600 which can communicate with the sensor through the wireless LAN. The self ball 100 received the notification performs a predetermined specific operation (for instance, vibrations with a specific pattern and guidance in voice) indicating that the provider of the content is in the specific place. When sensing the operation of the self ball 100, the user goes toward the specific place and may have contact there after seeing who the provider of the content is.

(5) In a case where a content (attention content) having the interest level equal to or more than the threshold is found out among from the information of the interest level of the user stored in the interest level storage unit 124 of the self ball 100 of the user or the interest level DB 604, information such as the next visiting schedule of the provider of the content may be notified to the user. A process for the notification is performed by the self ball 100 and/or the server 600.

The system of each example and each exemplary embodiment described above has been described to be installed in the shared work space 10, but the application of these systems may be not limited to the shared work space 10.

In the respective exemplary embodiments described above, the user carries with the circular information presentation apparatus such as the self ball 100, but this has been given as merely instance. Even in the information presentation apparatus of other shapes such as a rugby-ball shape, a cylindrical shape, and a polygon columnar shape, the communication promoting operation that the information presentation apparatus moves toward the counterpart user carried with the common interest can be executed.

Portions of serving to perform the information processing among the self ball 100, the digital signage system 200, the visit space system 300, the lounge system 400, and the multi-display system 500 illustrated above are realized by executing a program indicating the functions of the respective system in one or plural computers for instances. Herein, for instance, the computer has a circuit configuration in which, as hardware, for example, a microprocessor such as a CPU, a memory (primary storage) such as a random access memory (RAM) and a read only memory (ROM), a controller which controls a fixed storage device such as an HDD (hard disk drive) and an SSD (solid storage drive), various I/O (input/output) interfaces which are connected to an input/output device such as a camera and a speaker, and a network interface which performs a control for the connection with a network such as a local area network, all of which are connected through a bus. In addition, a disk drive for reading and/or writing in and/or from portable disc recording media such as a CD and a DVD, and a memory reader for reading and/or writing from and/or in various types of portable non-volatile storage media such a flash memory may be connected through the I/O interface, for instance. A program in which process details of the respective function modules which are described above are described is stored in a fixed storage device through a recording medium such as a CD and a DVD, or through a communication unit such as a network, and installed in the computer. The program stored in the fixed storage device is read out to the RAM and executed by a microprocessor such as the CPU, so that the functional module group described above can be realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system, comprising:
a recognition unit that recognizes a plurality of users near a display device that displays information;
an acquiring unit that acquires information of an interest level of the plurality of users recognized by the recognition unit with respect to a first content or first keyword relating to the first content and a second content or second keyword relating to the second content; and
a display control unit that controls the display device to display the information on the first content or the first keyword in a highlighted manner relative to the second content or the second keyword when a number of users having the interest level with respect to the first content or the first keyword equal to or greater than a threshold is greater than a number of users having the interest level with respect to the second content or the second keyword equal to or greater than the threshold.

2. The information processing system according to claim 1, wherein the display control unit controls a display position on the display device of the information on the first content or the first keyword according to positions of the plurality of users, when the plurality of users commonly have the interest level with respect to the first content or the first keyword equal to or greater than the threshold.

3. The information processing system according to claim 1, wherein, when a sender of the information on the first content, the first keyword, the second content, or the second keyword displayed on the display device is in a facility installed with the display device, or when the sender is scheduled to come to the facility, the display device is controlled to enlarge a display area for the information.

4. The information processing system according to claim 1, further comprising a driving mechanism that, when a display area for the information on the first content or the first keyword is displayed in the highlighted manner relative to the second content or the second keyword on the display device, issues a notification through vibrations to the users among the plurality of users recognized by the recognition unit who have the interest level equal to or greater than the threshold with respect to the first content or the first keyword.

5. The information processing system according to claim 1, further comprising: a driving mechanism that, when the information on the first content or the first keyword is displayed in the highlighted manner relative to the second content or the second keyword on the display device, issues a notification through vibrations to a sender of the information on the first content or the first keyword.

6. The information processing system according to claim 1, further comprising a light-emitting mechanism that, when the information on the first content or the first keyword is displayed in the highlighted manner relative to the second content or the second keyword on the display device, issues a notification through light emission to the users among the plurality of users recognized by the recognition unit who have the interest level equal to or greater than the threshold with respect to the first content or the first keyword.

7. The information processing system according to claim 1, further comprising a communication unit that, when the information on the first content or the first keyword is displayed in the highlighted manner relative to the second content or the second keyword on the display device, issues a notification to a sender of the information on the first content or the first keyword.

8. The information processing system according to claim 1, wherein the display control unit controls the display device to display the information on the first content or the first keyword in a highlighted manner relative to the second content or the second keyword by enlarging a display area for the information on the first content or the first keyword.

* * * * *